United States Patent
Karjala et al.

(10) Patent No.: US 8,415,442 B2
(45) Date of Patent: *Apr. 9, 2013

(54) HIGH PRESSURE LOW DENSITY POLYETHYLENE RESINS WITH IMPROVED OPTICAL PROPERTIES PRODUCED THROUGH USE OF HIGHLY ACTIVE CHAIN TRANSFER AGENTS

(75) Inventors: Teresa P. Karjala, Lake Jackson, TX (US); Christopher R. Eddy, Lake Jackson, TX (US); Mehmet Demirors, Pearland, TX (US); Wallace W. Yau, Pearland, TX (US); Sarat Munjal, Lake Jackson, TX (US); Stefan Hinrichs, Terneuzen (NL); Jian Wang, Rosharon, TX (US); Otto J. Berbee, Hulst (NL); Werner Zschoch, Naumburg (DE); Cornelis J. Hosman, Ijzendijke (NL); Lonnie G. Hazlitt, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/063,960

(22) PCT Filed: Oct. 1, 2009

(86) PCT No.: PCT/US2009/059263
§ 371 (c)(1),
(2), (4) Date: Mar. 15, 2011

(87) PCT Pub. No.: WO2010/042390
PCT Pub. Date: Apr. 15, 2010

(65) Prior Publication Data
US 2011/0178253 A1    Jul. 21, 2011

Related U.S. Application Data

(60) Provisional application No. 61/103,374, filed on Oct. 7, 2008.

(51) Int. Cl.
*C08F 10/02* (2006.01)
*C08F 2/38* (2006.01)
*B01J 19/24* (2006.01)

(52) U.S. Cl.
USPC .......... 526/352.2; 526/64; 526/224; 525/240; 521/143

(58) Field of Classification Search .......... 526/64, 526/224, 352.2; 525/240; 521/143
See application file for complete search history.

(56) References Cited

U.S. PATENT DOCUMENTS

| 2,982,759 | A | * | 5/1961 | Heuse ........................ 525/333.9 |
| 3,377,330 | A | | 4/1968 | Mortimer |
| 3,399,185 | A | | 8/1968 | Schappert |
| 3,654,253 | A | | 4/1972 | Steigerwald et al. |
| 3,657,211 | A | | 4/1972 | Steigerwald et al. |
| 3,917,577 | A | | 11/1975 | Trieschmann et al. |
| 3,969,297 | A | * | 7/1976 | Teer et al. ...................... 524/745 |
| 4,135,044 | A | * | 1/1979 | Beals ............................... 526/64 |
| 4,599,392 | A | | 7/1986 | McKinney et al. |
| 6,407,191 | B1 | | 6/2002 | Mezquita et al. |
| 6,569,962 | B1 | | 5/2003 | Zschoch et al. |
| 6,596,241 | B2 | | 7/2003 | Donck |
| 6,673,878 | B2 | | 1/2004 | Donck |
| 6,677,408 | B1 | * | 1/2004 | Mahling et al. .................. 526/64 |
| 6,899,852 | B2 | | 5/2005 | Donck |
| 2003/0134975 | A1 | * | 7/2003 | Jordens et al. .................. 525/64 |
| 2004/0024793 | A1 | | 2/2004 | Kawachiya |
| 2004/0054097 | A1 | | 3/2004 | Maehling et al. |
| 2004/0247492 | A1 | | 12/2004 | Kamey |
| 2007/0117946 | A1 | * | 5/2007 | Schwab et al. ............. 526/348.1 |
| 2008/0125553 | A1 | | 5/2008 | Conrad et al. |

FOREIGN PATENT DOCUMENTS

| GB | 0997408 | | 7/1965 |
| GB | 997408 | * | 7/1965 |
| WO | WO03055926 A1 | | 7/2003 |
| WO | WO2005090419 A1 | | 9/2005 |
| WO | WO2006049783 A1 | | 5/2006 |
| WO | WO2007061593 A1 | | 5/2007 |
| WO | WO2010042390 A1 | | 4/2010 |

OTHER PUBLICATIONS

Mortimer, George A.; Chain Transfer in Ethylene Polymerization; Journal of Polymer Science, Part A-1, vol. 4, 881-900 (1966).
Mortimer, George A.; Chain Transfer in Ethylene Polymerization—IV. Additional Study at 1360 Atm and 130 C; Journal of Polymer Science, Part A-1, vol. 8, 1513-1523 (1970).
Mortimer, George A.; Chain Transfer in Ethylene Polymerization—VI. The Effect of Pressure; Journal of Polymer Science, Part A-1, vol. 8, 1543-1548 (1970).
Mortimer, George A.; Chain Transfer in Ethylene Polymerization—VII. Very Reactive and Depletable Transfer Agents; Journal of Polymer Science, Part A-1, vol. 10, 163-168 (1972).
Ehrlich, P., Mortimer, George A.; Fundamentals of the Free-Radical Polymerization of Ethylene; Advanced Polymers, vol. 7, 386-448 (1970).
Goto, et al; Applied Polymer Symp.; Journal of Applied Polymer Science; vol. 36, 21 (1981).
Trinkle,S, Friedrich, C.; Rheologica Acta, 2001. 40 (4), pp. 322-328.

\* cited by examiner

Primary Examiner — Fred M Teskin

(57) ABSTRACT

Disclosed is an ethylene-based polymer with a density from about 0.90 to about 0.94 in grams per cubic centimeter, with a molecular weight distribution ($M_w/M_n$) from about 2 to about 30, a melt index ($I_2$) from about 0.1 to about 50 grams per 10 minutes, and further comprising sulfur from about 5 to about 4000 parts per million. The amount of sulfur is also determined based upon the total weight of the ethylene-based polymer. Also disclosed is process for making an ethylene-based polymer which includes the steps of splitting a process fluid for delivery into a tubular reactor; feeding an upstream process feed stream into a first reaction zone and at least one downstream process feed stream into at least one other reaction zone, where the process fluid has an average velocity of at least 10 meters per second; and initiating a free-radical polymerization reaction.

7 Claims, 10 Drawing Sheets

HIGH PRESSURE LOW DENSITY POLYETHYLENE RESINS WITH IMPROVED OPTICAL PROPERTIES PRODUCED THROUGH USE OF HIGHLY ACTIVE CHAIN TRANSFER AGENTS

CROSS-REFERENCE TO RELATED PATENT APPLICATIONS

This application claims priority from U.S. Provisional Application Ser. No. 61/103,374, filed Oct. 7, 2008 (Attorney Docket No. 67403). For purposes of United States patent practice, the contents of this application is herein incorporated by reference in its entirety.

FIELD OF THE INVENTION

This invention relates to compositions and processes for forming low density ethylene-based polymers such as high pressure, low density polyethylene (LDPE) resins.

BACKGROUND OF THE INVENTION

LDPE has been produced in autoclave reactors, tubular reactors, and combinations thereof. Each type of reactor has its advantages and disadvantages, but economics and product design drive the need for improvements. The operation of and type(s) of reactor(s) employed can dramatically affect the physical properties of the resulting LDPE. Such improvements are desired for applications such as blown and cast film, where especially good optical properties are desired.

High pressure, low density ethylene-based polymers have a density in a range of about 0.91 to about 0.94 g/cm$^3$. Low density ethylene-based polymers typically have random branching structures that contain both alkyl substituents (short chain branches) as well as long chain branches. Most LDPE polymers are homopolymers, although some are copolymers and interpolymers, typically using other α-olefin comonomers.

Chain transfer agents (CTAs), or "telogens", are often used to control the melt index in a free-radical polymerization process. "Chain transfer" involves the termination of growing polymer chains, thus limiting the ultimate molecular weight of the polymer material. Chain transfer agents are typically hydrogen atom donors that react with a growing polymer chain and stop the polymerization reaction of the chain. Known CTAs include many types of hydrogen atom donor compounds, such as saturated or unsaturated hydrocarbons, aldehydes, ketones, and alcohols. By manipulating the concentration and type of chain transfer agent used in a process, one can affect the average length and molecular weight distribution of the polymer chains. This in turn affects the melt index (I$_2$ or MI), which is related to molecular weight.

Many chain transfer agents are known in the art for use in high-pressure, low density polyethylene production. References that disclose the use of chain transfer agents in free-radical polymerization of ethylene and ethylene-based polymers include Ehrlich, P., and Mortimer, G. A., "Fundamentals of the Free-Radical Polymerization of Ethylene", *Advanced Polymers*, Vol. 7, 386-448 (1970); Mortimer, George A., "Chain Transfer in Ethylene Polymerization—IV. Additional Study at 1360 Atm and 130° C.", *Journal of Polymer Science*, Part A-1, Vol. 8, 1513-23 (1970); Mortimer, George A., "Chain Transfer in Ethylene Polymerization—VI. The Effect of Pressure", *Journal of Polymer Science*, Part A-1, Vol. 8, 1543-48 (1970); Mortimer, George A., "Chain Transfer in Ethylene Polymerization—VII. Very Reactive and Depletable Transfer Agents", *Journal of Polymer Science*, Part A-1, Vol. 10, 163-168 (1972); Great Britain Patent No. 997,408 (Cave); U.S. Pat. No. 3,377,330 (Mortimer); U.S. Patent Publication No. 2004/0054097 (Maehling, et al.); and U.S. Pat. Nos. 6,596,241; 6,673,878; and 6,899,852 (Donck).

After hydrogen atom donation, it is known that a chain transfer agent may form a radical which can start a new polymer chain. The result is that the original CTA is incorporated into a new or existing polymer chain, thereby introducing a new functionality into the polymer chain associated with the original CTA. The CTA may introduce new functionality into the polymer chain that is not normally the result of the monomer/comonomer polymerization.

Low density ethylene-based polymers produced in the presence of CTAs are modified in a number of physical properties, such as processability; film optical properties such as haze, gloss and clarity; density; stiffness; yield point; film draw; and tear strength. For example, an α-olefin acting as a CTA could also introduce a short chain branch into a polymer chain upon incorporation.

SUMMARY OF THE INVENTION

Disclosed is an ethylene-based polymer with a density from about 0.90 to about 0.94 in grams per cubic centimeter, with a molecular weight distribution (M$_w$/M$_n$) from about 2 to about 30, a melt index (I$_2$) from about 0.1 to about 50 grams per 10 minutes, and further comprising sulfur from about 5 to about 4000 parts per million. The amount of sulfur in the ethylene-based polymer is determined using a procedure called the Total Sulfur Concentration method, described infra. The amount of sulfur is also determined based upon the total weight of the ethylene-based polymer. In some disclosed ethylene-based polymers, the polymer is a homopolymer.

Also disclosed is an ethylene-based polymer with long chain branching. The long chain branching is characterized by a gpcBR value greater than 0.05 as determined by the gpcBR Branching Index, described infra. The long chain branching is also characterized by a GPC-LS Characterization value greater than 2.1 as determined by the GPC-LS Characterization method, described infra. In some disclosed ethylene-based polymers, the GPC-LS Characterization value is from about 2.1 to about 10.

Also disclosed is an ethylene-based polymer with a zero-shear viscosity, η$_0$, in Pascal-seconds at 190° C. as determined using a Zero Shear Viscosity method, described infra, an absolute weight average molecular weight value, M$_{w,\,Abs}$, in grams per mole, and a conventional weight average molecular weight value, M$_{w,\,GPC}$. These properties for some of the disclosed ethylene-based polymer have the following numerical relationship:

$$(3.6607*\text{Log}\,M_{w,Abs})-16.47 < \text{Log}\,\eta_0 *(M_{w,GPC}\,M_{w,Abs}) < (3.6607*\text{Log}\,M_{w,Abs})-14.62,$$

Also disclosed is an ethylene-based polymer with a surface haze, S, an internal haze, I, both in units of % haze and both determined using a Surface and Internal Haze method, described infra, and a melt index (I$_2$) in grams per 10 minutes. These properties for the disclosed ethylene-based polymer have the following numerical relationship:

$$S/I \leq (-0.057*I_2)+1.98,$$

preferably wherein the ethylene-based polymer comprises sulfur.

Disclosed is a process for making an ethylene-based polymer adduct which includes the steps of splitting a process fluid, a portion of which comprises ethylene, for delivery into a tubular reactor, into an upstream process feed stream and at least one downstream process feed stream; feeding the upstream process feed stream into a first reaction zone and the at least one downstream process feed stream into an at least one other reaction zone to recombine the process fluid, where inside the tubular reactor in at least one of several reaction zones the process fluid has an average velocity of at least 10 meters per second; and initiating a free-radical polymerization reaction inside the tubular reactor so as to produce an ethylene-based polymer adduct and heat. The disclosed process includes a tubular reactor comprised of several reaction zones including a first reaction zone and at least one other reaction zone. The disclosed process also includes an upstream process feed stream that is further comprised of at least one chain transfer agent with a chain transfer constant, Cs, greater than 1. In some disclosed processes, the at least one chain transfer agent with a Cs greater than 1 has a concentration in the upstream process feed stream that is higher than any concentration of the at least one chain transfer agent with a Cs greater than 1 in any of the at least one downstream process feed streams. In some disclosed processes, the process fluid further comprises at least one chain transfer agent with a Cs less than 1.

Disclosed is another process for making an ethylene-based polymer adduct which includes the steps of feeding a process fluid via an upstream process feed stream into a first reaction zone of a tubular reactor, where the process fluid has an average velocity in the tubular reactor in at least one of several reaction zones of at least 10 meters per second; and initiating a free-radical polymerization reaction inside the tubular reactor so as to produce an ethylene-based polymer adduct and heat. The disclosed process includes a tubular reactor comprised of several reaction zones including a first reaction zone and at least one other reaction zone. The disclosed process also includes an upstream process feed stream that is further comprised of at least one chain transfer agent with a chain transfer constant, Cs, greater than 1. In some disclosed processes, the process fluid further comprises at least one chain transfer agent with a Cs less than 1.

BRIEF DESCRIPTION OF THE DRAWINGS

The Summary as well as the Detailed Description will be better understood when read in conjunction with the appended drawings. It should be understood, however, that the scope of the claimed inventions are not limited to the precise arrangements and instrumentalities shown. The components in the drawings are not necessarily to scale. In the drawings, like reference numerals designate corresponding parts throughout the several views.

DESCRIPTION OF EMBODIMENTS OF THE INVENTION

Figure 1:
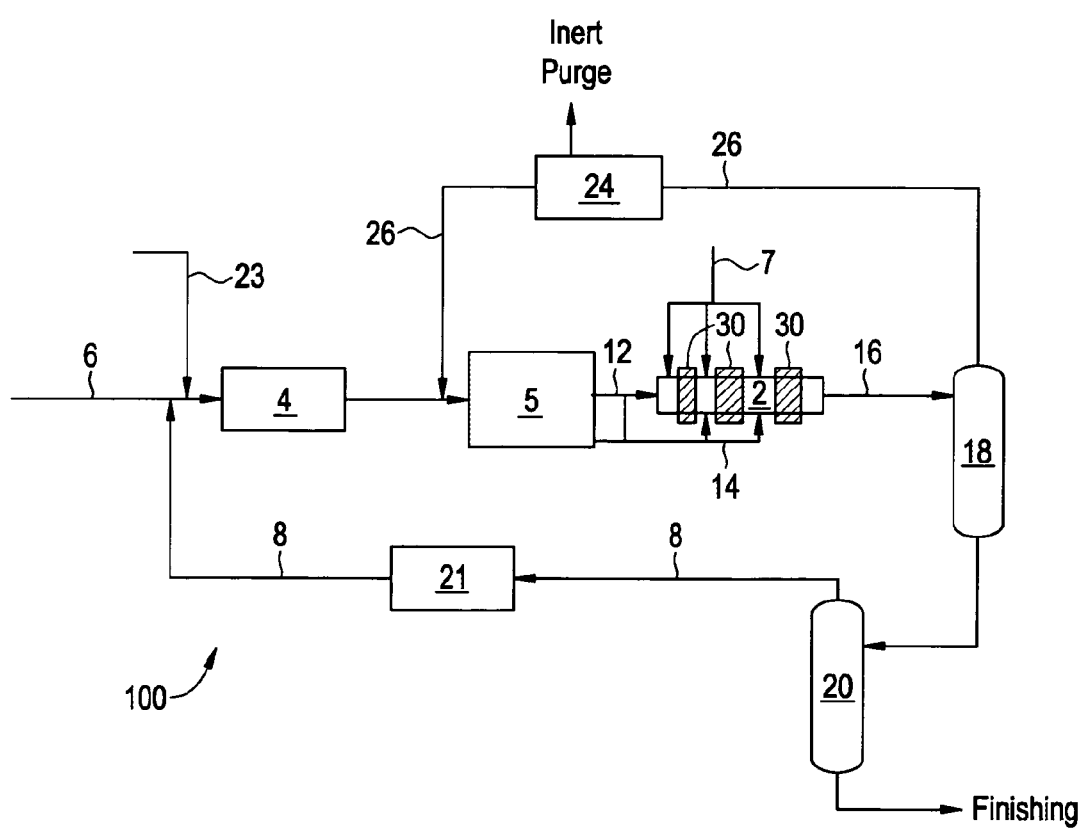
FIG. 1 is a diagram of a process describing the elements of a disclosed tube reactor system 100.

The inventive compositions are low density ethylene-based polymers having a narrow molecular weight distribution, which can be used for blown and cast films used alone or in blends with other polymers, created in a free-radical polymerization of ethylene, and optionally a comonomer, in the presence of at least one chain transfer agent (CTA). At least one of the chain transfer agents is a high-activity CTA, such as tert-dodecyl mercaptan (TDM).

In typical high pressure free radical LDPE production processes, "low-activity" chain transfer agents are typically used to control reactions in the process. A low-activity CTA has a chain transfer constant (Cs) that is less than 1. For example, at certain conditions propionaldehyde has a Cs~0.33 as reported in Mortimer, George A., "Chain Transfer in Ethylene Polymerization—VII. Very Reactive and Depletable Transfer Agents", *Journal of Polymer Science*, Part A-1, Vol. 10, 163-168 (1972). The chain transfer constant, Cs, for a chain transfer agent is defined as the ratio of the reaction rate constant for the chain transfer agent relative to the reaction rate constant for propagation of the monomer.

A "high-activity" chain transfer agent (Cs greater than or equal to 1) is a chain transfer agent that has a sufficiently high degree of activity during free-radical polymerization that the growing monomer chain will more likely accept the hydrogen atom donation given the opportunity rather than propagate with another monomer molecule. In such cases where the Cs is greater than one, the high-activity CTA in the process fluid is consumed in a manner where the relative concentration of the chain transfer agent diminishes with respect to the concentration of monomer as the reaction proceeds forward in time. If the reaction continues and no additional chain transfer agent is provided, the high-activity CTA will become depleted. It is feasible that a reaction system may not have enough, if any, chain transfer agent to control molecular weight.

By using a high-activity chain transfer agent at the beginning of the process with a Cs range of greater than 1 and can be up to 5,000, preferably up to 500, the formation of the high-molecular weight polymer chains is suppressed at the beginning of the process. This results in polymers with a narrower molecular weight distribution. The suppression prevents the formation of highly branched, high-molecular weight polymer chains that form in the later stages of the process.

There are other benefits of using a high-activity CTA to suppress high-molecular weight polymer chain formation in the early part of the process. The suppression improves the overall single-pass process conversion by improving process system performance.

However, effectively using a high-Cs chain transfer agent by itself in a free-radical polymerization process is challenging. One means of doing so would be by adding additional high-Cs CTAs later in the process. Another means would be to incorporate at the beginning of the process a combination of at least one high-Cs CTA and at least one low-Cs CTA. In such a process in which as the reaction proceeds from beginning to end, the high-activity CTA is preferentially consumed during the period when the monomer is in relatively high concentration, especially in tubular reactor systems with more than one reaction zone (i.e., initiator injection points). Later in the process, when both monomer and high-Cs CTA have been relatively depleted, the low-Cs CTA, which has not significantly reacted with the forming polymer chains because of its relative reaction rates and concentrations as compared to the monomer, has a greater influence over the process by supporting chain transfer to control molecular weight.

Additionally, polymers produced in the presence of chain transfer agents, especially high-Cs chain transfer agents, may have interesting physical and chemical properties due to incorporation of the chain transfer agents. Properties that may be modified include its processibility (e.g., shear viscosity), optical properties such as haze and clarity, density, stiffness, yield point, film draw and tear strength.

A low density ethylene-based polymer is disclosed that has a density from about 0.90 to about 0.94 g/cm$^3$, a molecular weight distribution, $M_w/M_n$, from about 2 to about 30, and a melt index, $I_2$, from about 0.1 to about 50 grams per 10 minutes. The amount of sulfur in the ethylene-based polymer is based upon the total weight of the ethylene-based polymer and is determined using the Total Sulfur Concentration method.

The low density ethylene-based polymer may be a homopolymer of ethylene or it may be an ethylene-based interpolymer comprised of ethylene and at least one comonomer. Comonomers useful for incorporation into an ethylene-based interpolymer, especially an ethylene/α-olefin interpolymer include, but are not limited to, propylene, isobutylene, 1-butene, 1-pentene, 1-hexene, 3-methyl-1-pentene, 4-methyl-1-pentene, and 1-octene, non-conjugated dienes, polyenes, butadienes, isoprenes, pentadienes, hexadienes (for example, 1,4-hexadiene), octadienes, styrene, halo-substituted styrene, alkyl-substituted styrene, tetrafluoroethylenes, vinylbenzocyclobutene, naphthenics, cycloalkenes (for example, cyclopentene, cyclohexene, cyclooctene), and mixtures thereof. Ethylene is frequently copolymerized with at least one $C_3$-$C_{20}$ α-olefin, such as propene, 1-butene, 1-hexene and 1-octene.

The low density ethylene-based polymer may further comprise sulfur, where the sulfur may be at least 5 ppm total sulfur concentration based upon the total weight of the ethylene-based polymer. The sulfur that is incorporated into the ethylene-based polymer originates from the use of a high Cs chain transfer agent with sulfur as part of its molecular structure. Some mercaptans, such as tert-dodecyl mercaptan, are high-Cs chain transfer agents and preferentially incorporate into ethylene-based polymer chains during free-radical polymerization to effect chain transfer. It is believed that incorporation of sulfur into ethylene-based polymers will lead to improved properties such as oxidative resistance.

Additionally, "free sulfur" compounds, or sulfur-containing compounds included as a byproduct and other compounds homogeneously incorporated with the ethylene-based polymer, are also present.

The low density ethylene-based polymer can exhibit a numerical relationship between internal haze, surface haze, and $I_2$ melt index of the polymer that is different than other low density ethylene-based polymers. Further disclosed is an ethylene-based polymer with a surface/internal haze ratio versus melt index ($I_2$) relationship for a range of $I_2$ of about 0.1 to about 1.5 grams per 10 minutes. Further disclosed is an ethylene-based polymer with a surface/internal haze ratio versus melt index relationship that is further comprised of sulfur. Further disclosed is an ethylene-based polymer with a surface/internal haze ratio versus melt index relationship that exhibits long chain branching as characterized by a gpcBR value greater than 0.05 as determined by a gpcBR Branching Index by 3D-GPC method.

Disclosed is a low density ethylene-based polymer further comprising sulfur that exhibits a numerical relationship between conventionally calibrated molecular weight, $M_{w, GPC}$, and an absolute molecular weight, $M_{w, Abs}$, both in grams per mole as determined by the Triple Detector Gel Permeation Chromatography method, described infra, and a zero shear viscosity, $\eta_0$, in Pascal-seconds at 190° C., as determined by the Zero Shear Viscosity method, described infra. Further disclosed is an ethylene-based polymer with a conventionally calibrated molecular weight, an absolute molecular weight, and a zero shear viscosity relationship that exhibits long chain branching as characterized by a gpcBR value greater than 0.05 as determined by a gpcBR Branching Index by the 3D-GPC method.

Disclosed is a low density ethylene-based polymer that exhibits a relationship between the concentration-normalized light scattering (LS) response value and the logarithm value of conventionally calibrated molecular weight, $M_{w, GPC}$, that is different than that of other low density ethylene-based polymers. The difference is captured in a relationship called a GPC-LS Characterization value (Y). The GPC-LS Characterization value (Y) is determined by the GPC-LS Characterization method, described infra. Disclosed is an ethylene-based polymer having a GPC-LS Characterization value (Y) of greater than 2.1 and has long chain branching. Long chain branching is characterized by a gpcBR value greater than 0.05 as determined by a Determination of gpcBR Branching Index by the 3D-GPC method. Also disclosed is an ethylene-based polymer having a GPC-LS Characterization value (Y) of greater than 2.3, preferably greater than 2.4. Also disclosed is an ethylene-based polymer with the given GPC-LS Characterization values (Y) in a range of about 2.1 to about 10. Also disclosed is an ethylene-based polymer with the given GPC-LS Characterization values (Y) that is further comprised of sulfur.

The disclosed processes are high pressure free radical reactor processes for the polymerization of ethylene and, optionally, at least one comonomer, to produce a low density ethylene-based polymer adduct and byproduct heat. The disclosed processes use at least one high-Cs (and in some cases a mixture of at least one high-Cs and at least one low-Cs) chain transfer agent(s) to assist in the formation of a narrower molecular weight distribution low density ethylene-based polymer than traditionally made.

One process of the invention involves a free-radical initiated low density ethylene-based polymerization reaction in a tubular reactor process. Besides feeding the reactor ethylene and, optionally, at least one comonomer, other components are fed to the reactor to initiate and support the free radical reaction as the ethylene-based polymer adduct is formed, such as reaction initiators, catalysts, and chain transfer agents. The process is a tubular polymerization reaction where a process fluid partially comprised of ethylene is freeradically polymerized creating a highly exothermic reaction. The reaction occurs under high operating pressure (1000 bar to 4000 bar) in turbulent process fluid flow (hence low density ethylene-based polymers also referred to as "high pressure" polymers) at maximum temperatures in the reactor of 160° C. to 360° C., while the initial initiation temperature for the reaction is between 120° C. to 200° C. At certain points along the tube, a portion of the heat produced during the free-radical polymerization may be removed through the tube wall. Typical single-pass conversion values for a tubular reactor range from about 20 to 40 percent. Tubular reactor systems typically also include at least one monomer recycle loop to improve conversion efficiency.

A typical tubular polymerization reaction system is shown in FIG. 1. A tube reactor system 100 has a tube 2 with a length typically from about 250 to about 2000 meters. The length and diameter of the tube affects the residence time and velocity of the process fluid as well as the heat addition/removal capacity of tube 2. Suitable, but not limiting, reactor lengths can be between 100 and 3000 meters, and some between 500 and 2000 meters. Tube 2 also has a working internal diameter from about 30 to about 100 mm based upon desired system throughput, operational pressure range, and the degree of turbulent flow for mixing and reaction. The working internal diameter may widen and narrow at points along tube 2 to accommodate different portions of the process, such as turbulent mixing, injection of reaction initiators and feeds, and process fluid throttling (i.e., accelerating process fluid velocity at the expense of pressure loss).

For processes of this invention, the average velocity of the process fluid is at least 10 meters per second, and even as high as 25 meters per second. Process fluid velocity is important for a numbers of reasons, including overall process throughput, ethylene conversion, heat removal capacity, and, for processes with a number of reaction zones, management of local reaction initiation temperatures and injection amounts of chain transfer agents and process initiators.

Referring to FIG. 1 and tube reactor system 100, a primary compressor 4, which may be a multi-stage compressor or two or more compressors running in parallel, is connected at its intake side to a source of fresh monomer/comonomer feed called fresh feed conduit 6 and a low pressure system recycle conduit 8.

Still referring to FIG. 1, a second compressor, in some cases called a hypercompressor 5, which may be a multi-stage compressor, is connected at its intake to the discharge of the primary compressor 4 as well as the second of the two recycle streams called the high pressure system recycle conduit 26.

After pressurization by the hypercompressor 5, the process fluid is fed into the tube 2 through conduit 12 as an upstream process feed stream. In some disclosed processes, the process fluid is split and fed to tube 2 at different feed locations. In such processes, part of the process fluid is fed to tube 2 through conduit 12 as an upstream process feed stream to the first reaction zone and the other parts (depending on the number of splits made in the process fluid) would be fed to tube 2 as downstream process feed streams to the other reaction zones through various conduits 14.

As disclosed, a process using several reaction zones with fresh feeds, including a first reaction zone and at least one other reaction zone, improves overall ethylene conversion by removing heat in the system through the introduction of feed streams (i.e., initiator, monomer) downstream of the first reaction zone that are cooler than the process fluid in the tube 2. Tubular reactor systems with multiple reaction and feed zones permit the tube reactor to operate at an overall lower average peak reactor temperature. This assumes that conversion between the multiple reactor or feed zones and analogous non-multiple reaction or feed zone tubular reactors are kept the same. See Goto, et al., *J. Appl. Polymer Science*, Appl. Polymer Symp., Vol. 36, 21 (1981). One reason for this is that the downstream process feed passing through conduits 14 may be cooled before injection into the reaction system or is inherently colder, thereby reducing the overall reaction process fluid temperature before (re)initiation of polymerization. As previously mentioned, cooling of the process would permit additional initiator to be added, thereby improving single-pass conversion of monomer/comonomers. In such disclosed processes, the temperature of the downstream process feed stream(s) are preferably below 120° C., more preferably below 50° C., and most preferably below 30° C. Lower average reactor temperatures are important because it reduces the overall level of long chain branching, which produces narrower MWD products. Additionally, the use of multiple feed locations along the tube are also preferable for producing narrow MWD resins for use in applications such as film resins where optical properties are important. Multiple feed locations may also result in a narrowing of the molecular weight distribution relative to analogous systems that do not have multiple reaction zones.

In disclosed processes where there are more than one reaction zone, one or more free-radical initiator or catalyst conduits 7 convey initiator or catalyst to tube 2 near or at the beginning of each reaction zone.

The type of free radical initiator to be used is not critical. Examples of free radical initiators include oxygen-based initiators such as organic peroxides (PO). Preferred initiators are t-butyl peroxy pivalate, di-t-butyl peroxide, t-butyl peroxy acetate, and t-butyl peroxy-2-ethylhexanoate, and mixtures thereof. These organic peroxy initiators are used in conventional amounts of between 0.0001 and 0.01 weight percent based upon the weight of high pressure feed.

The free-radical polymerization reaction resulting in the disclosed ethylene-based polymer adduct occurs in each reaction zone where initiator or catalyst is present. The reaction is an exothermic reaction that generates a large quantity of heat. Without cooling, the adiabatic temperature rise in the process fluid and the ethylene-based polymer adduct (which absorbs and retains heat) would result in unfavorable reactions. Such reactions may include ethylene decomposition (where ethylene and polyethylene break down in a combustionless reaction into base products) or excessive long chain branching, which would lead to a broadening of the molecular weight distribution.

In typical processes, high molecular weight polymer chains form and "plate out" on the insides of reactor tube walls, insulating the process and hindering heat removal. In the disclosed processes, which include use of a high-Cs chain transfer agent and a process fluid velocity above 10 meters per second, the extent to which this insulative layer forms is reduced. This improves the heat removal process versus a comparable process that does not use a high-Cs chain transfer agent. Also, in some embodiments the process fluid in tube 2 is periodically cooled directly by the addition of downstream process feed stream(s) from conduit 14. Because heat removal is improved versus a comparable process that does not use a high-Cs chain transfer agent or cooled downstream process feed streams, the process fluid in tube 2 enters the at least one other reaction zones at a lower reinitiation temperature; therefore leading to improved single pass process conversion. This permits the addition of a greater amount of catalyst or initiator to reach a similar peak process fluid temperature during each reaction reinitiation, if needed.

When delivering a high-Cs chain transfer agent to the process, the impact on the ability to remove heat from the tubular reactor during steady-state operations can be seen as compared to when a high-Cs CTA is not used. In some disclosed processes, as compared to similar and analogous processes where conditions are otherwise equivalent and are at steady-state but do not use a high-Cs CTA:

(a) at least 1% and preferably at least 3% more heat is removed from at least one reaction zone; and/or (b) the average temperature difference between the inlet and the outlet temperatures (the temperature "delta") of a heat removal medium used in a heat exchanger that removes heat from a reaction system is statistically significantly higher (i.e., greater than 3 times the standard deviation of the temperature delta over a fixed period of time) than that of an analogous heat removal medium used in an analogous heat exchanger in an analogous process; and/or (c) the difference in the outlet temperature of the heat removal medium used in a heat exchanger that removes heat from a reaction system is at least 1° C. higher for a fixed period of time than that of an analogous heat removal medium used in an analogous heat exchanger in an analogous process.

In disclosed processes, at least one chain transfer agent is added to the process fluid which has a Cs greater than one. In some disclosed processes, at least two chain transfer agents—one with a Cs greater than one and another with a Cs less than one—are added to the process fluid. More than one chain transfer agent may be used to take advantage of relative properties during free-radical polymerization inside tube 2.

In disclosed processes, chain transfer agents are added so as to blend as homogeneously as possible with the process fluid before introduction to the tube 2. Depending on the physical layout of the tube reactor system 100 and chemical characteristics of the process fluid and the CTAs, such blending may be achieved by injecting the CTAs at the inlet of the booster compressor 21 for the low pressure system recycle conduit 8, in the inlet of the primary compressor 4, in the inlet of the hypercompressor 5, at the outlet of the hypercompressor 5, at the inlet of the tube 2 or together with the first peroxide injection.

Although not shown in FIG. 1, selective feeding of CTAs to the tube reactor 2 is possible. In such cases, the CTAs may be fed into the tube 2 selectively by being injected into conduits 12 or 14 instead of using the CTA source 23 as shown in FIG. 1. In specific cases, the CTAs may be injected from CTA source 23 only into the upstream process feed stream via conduit 12. This flexibility in the disclosed process regarding the injection of CTAs from CTA source 23 permits selective injection of CTAs only into the first reaction zone, or only into a different reaction zone, or into some or all of the reaction zones. It also permits the injection of different CTAs, including CTAs with different Cs characteristics, to be injected from CTA source 23 into different zones (e.g., a high-Cs CTA injected into the first reaction zone and a low-Cs CTA injected into the at least one other reaction zones) to optimize reaction system performance and ethylene-based polymer adduct properties.

In some disclosed processes where more than one CTA is used, one of the chain transfer agents has a Cs less than one and another chain transfer agent has a Cs greater than one. In such processes, the chain transfer agents may be fed to the system at different feed rates or amounts so as to customize their effectiveness in different parts of the process or to optimize the ethylene-based polymer properties. In some other disclosed processes, the feed rate of the low activity CTA may be regulated by the amount of recycled low activity CTA detected in either or both recycle streams 26 and 8. The feed amounts, ratio of chain transfer agents to each other, and relative amount of chain transfer agent to the amount of ethylene in the fresh feed conduit 6 will vary depending on several factors, including but not limited to the tube 2 and tube reactor system 100 geometry, production rates, the relative activities of the chain transfer agents, and the overall tube 2 residence time. The feed amounts and ratio of chain transfer agents may also be regulated based upon final ethylene-based polymer characteristics, such as melt viscosity, overall production amount, target molecular weight distribution, desired melt index, first zone peak temperature, residual CTAs or CTA byproducts, and tube process fluid velocity.

In disclosed processes, the concentration of chain transfer agent in the process fluid is from about 1 to about 600 molar ppm, and preferably from about 1 to about 200 molar ppm. In some disclosed processes, the concentration of the high-Cs CTA in the upstream process feed stream is from about 1 to about 600 molar ppm, and preferably from about 1 to about 200 molar ppm. In such disclosed processes, the disclosed CTA concentrations are found in the upstream process feed stream, such as conduit 12. In other disclosed processes, the CTA molar flow ratio, which is the ratio of the high-Cs CTA in moles/hour to the low-Cs CTA in moles/hour in the process fluid, is from about 0.01 to about 100, preferably from about 0.05 to about 5, and more preferably from about 0.05 to about 0.5.

Referring to FIG. 1, a mixture of ethylene-based polymer formed from the reaction, unreacted monomer (and comonomer), and unused feeds, such as solvents and CTAs, or degradation and side reaction products, passes from the tube outlet 16 to the separations part of the process. The separating and recycling part of the tube reactor system 100 process includes a high-pressure separator (HPS) 18, which receives the product polymer and process fluid mixture from the outlet of the tube 2. The tails of the HPS 18 conveys the polymer adduct and any remaining unreacted monomer/comonomer and other unused feeds that might be dissolved with the polymer adduct, to the low-pressure separator (LPS) 20. The higher pressure lights stream passes through the high pressure system recycle conduit 26, which may include a refining system 24 to cool and purify the stream and purge inert gases, and rejoins the process fluid passing from the primary compressor 4 to the hypercompressor 5.

When the heat removal medium is a liquid, a heat exchanger 30, may be used to effect heat transfer and cool the process fluid and the ethylene-based polymer adduct.

In the disclosed processes, there is an overall improvement in ethylene conversion. The overall improvement comes from the reduction in formation of high-molecular weight polymers chains early in the process, improvements in heat transfer, and from the ability to use more free-radical initiator. Given comparable steady state conditions, the improvement in the ethylene conversion for a disclosed process using at least one chain transfer agent with a Cs greater than 1 is at least 0.3 percent higher than the ethylene conversion in an analogous process lacking a chain transfer agent with a Cs greater than 1.

End-Uses

End-use products made using the disclosed ethylene-based polymers include all types of films (for example, blown, cast and extrusion coatings (monolayer or multilayer)), molded articles (for example, blow molded and rotomolded articles), wire and cable coatings and formulations, cross-linking applications, foams (for example, blown with open or closed cells), and other thermoplastic applications. The disclosed ethylene-based polymers are also useful as a blend component with other polyolefins.

The types of films that make be produced as end-use products from the disclosed ethylene-based polymers include silage films, sealants, silobags, stretch films, display packaging, shrink films, and heavy duty shipping sacks. Additionally, blown, cast and extrusion coatings (monolayer or multilayer) also may be produced using the disclosed ethylene-based polymers.

Definitions

The terms "blend" or "polymer blend" means a mixture of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art.

The term "comparable" means similar or like. For a given process, comparable means that for two or more process runs using the same physical process equipment (hence the process units in each run are analogous to one another), the difference between the peak temperature values for each analogous reaction zone (e.g., Reaction Zone 1—Peak Temperature of Example 1 and Reaction Zone 1—Peak Temperature of Comparative Example 1) for each of the several reaction zones is within 1° C. for the process to be deemed comparable.

The basis of comparison is for a period of 2.5 hours of steady-state conditions using 10 minute average data (as opposed to "spot data", which are individual data readings at specific points in time).

The term "composition" includes a mixture of materials which comprise the composition as well as reaction products and decomposition products formed from interaction and reaction between the materials of the composition.

The term "ethylene-based polymer" refers to a polymer that is formed from more than 50 mole percent polymerized ethylene monomer (based on the total amount of polymerizable monomers), and, optionally, one or more comonomers. A homopolymer of ethylene is an ethylene-based polymer.

The term "ethylene/α-olefin interpolymer" refers to an interpolymer that is formed from more than 50 mole percent polymerized ethylene monomer (based on the total amount of polymerizable monomers), and at least one α-olefin comonomer.

The term "homopolymer" is a polymer that is formed from only a single type of monomer, such as ethylene.

The term "interpolymer" refers to polymers prepared by the copolymerization of at least two different types of monomers. The term interpolymer includes copolymers, usually employed to refer to polymers prepared from two different monomers, and polymers prepared from more than two different types of monomers, such as terpolymers.

The term "LDPE" may also be referred to as "high pressure ethylene polymer" or "highly branched polyethylene" and is defined to mean that the polymer is partly or entirely polymerized in autoclave or tubular reactors at pressures above 13,000 psig with the use of free-radical initiators, such as peroxides (see, for example, U.S. Pat. No. 4,599,392 (McKinney, et al.)).

The term "polymer" refers to a compound prepared by polymerizing one or more monomers, whether of the same or a different type of monomer. The term polymer embraces the terms "homopolymer" and "interpolymer".

The term "sulfur containing compound" is a compound containing a —S— functional group in addition to carbon atoms substituted with hydrogen atoms, where a portion of the hydrogen atoms can be substituted by inert substituents or moieties. The presence of units derived from a sulfur group containing compound, such as mercaptans, can quantitatively be determined using known techniques, for example, by the Total Sulfur Concentration method given infra.

Testing Methods

Density: Samples for density measurement of a polymer are prepared according to ASTM D 1928. Measurements are made within one hour of sample pressing using ASTM D792, Method B.

Melt Index: Melt index, or $I_2$, of an ethylene-based polymer is measured in accordance with ASTM D 1238, Condition 190° C./2.16 kg.

Melt Strength: Melt strength measurements are conducted on a Gottfert Rheotens 71.97 (Göettfert Inc.; Rock Hill, S.C.) attached to a Gottfert Rheotester 2000 capillary rheometer. A polymer melt is extruded through a capillary die with a flat entrance angle (180 degrees) with a capillary diameter of 2.0 mm and an aspect ratio (capillary length/capillary radius) of 15. After equilibrating the samples at 190° C. for 10 minutes, the piston is run at a constant piston speed of 0.265 mm/second. The standard test temperature is 190° C. The sample is drawn uniaxially to a set of accelerating nips located 100 mm below the die with an acceleration of 2.4 mm/second$^2$. The tensile force is recorded as a function of the take-up speed of the nip rolls. Melt strength is reported as the plateau force (cN) before the strand broke. The following conditions are used in the melt strength measurements: Plunger speed=0.265 mm/second; wheel acceleration=2.4 mm/s$^2$; capillary diameter=2.0 mm; capillary length=30 mm; and barrel diameter=12 mm.

Dynamic Mechanical Spectroscopy: Dynamic Mechanical Spectroscopy (DMS) Dynamic oscillatory shear measurements are performed with the ARES system of TA Instruments (New Castle, Del.) at 190° C. using 25 mm parallel plates at a gap of 2.0 mm and at a constant strain of 10% under an inert nitrogen atmosphere. The frequency interval is from 0.03 to 300 radians/second at 5 points per decade logarithmically spaced. The stress response was analyzed in terms of amplitude and phase, from which the storage modulus (G'), loss modulus (G"), complex modulus (G*), tan δ, phase angle δ and complex viscosity (η*) were calculated. The complex modulus, G*, is a complex number with G' as its real and G" as its imaginary components, respectively (G*=G'±iG"). The magnitude of G* is reported as $|G^*|=(G'^2+G''^2)^{1/2}$. Both tan δ and the phase angle δ are related to the material's relative elasticity. Tan δ is the ratio of the loss modulus to the storage modulus $$\left(\tan\delta = \frac{G''}{G'}\right)$$

and the phase angle δ can be obtained from $$\delta = \tan^{-1}\frac{G''}{G'}.$$

The complex viscosity η* is also a complex number with η' as its real and η" as its imaginary components, respectively. The magnitude of η* is reported as $$\eta^* = (\eta'^2 + \eta'^2)^{1/2} = \left[\left(\frac{G''}{\omega}\right)^2 + \left(\frac{G'}{\omega}\right)^2\right]^{1/2},$$

where ω is the angular frequency in radians/second.

DSC: Differential Scanning calorimetry (DSC) can be used to measure the crystallinity of a sample at a given temperature for a wide range of temperatures. For example, a TA Instruments Q1000 DSC, equipped with a RCS (Refrigerated Cooling System) and an autosampler module is used to perform this analysis. During testing, a nitrogen purge gas flow of 50 ml/min is used. Each sample is pressed into a thin film and melted in the press at about 175° C.; the melted sample is then air-cooled to room temperature (~25° C.). A 3-10 mg, 6 mm diameter specimen is extracted from the cooled polymer, weighed, placed in a light aluminum pan (ca 50 mg), and crimped shut. Analysis is then performed to determine its thermal properties. The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 150° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are peak melting temperature ($T_m$), peak crystallization temperature ($T_c$), the heat of fusion ($H_f$) (in Joules per gram), and the % crystallinity for polyethylene samples calculated using Equation 1:

% Crystallinity=$[(H_f(J/g))/(292 J/g)] \times 100$ (Eq. 1)

The heat of fusion ($H_f$) and the peak melting temperature are reported from the second heat curve. The peak crystallization temperature is determined from the cooling curve.

Triple Detector Gel Permeation Chromatography: The Triple Detector Gel Permeation Chromatography (3D-GPC or TD-GPC) system consists of a Waters (Milford, Mass.) 150 C high temperature chromatograph (other suitable high temperatures GPC instruments include Polymer Laboratories (Shropshire, UK) Model 210 and Model 220 equipped with an on-board differential refractometer (RI). Additional detectors can include an IR4 infra-red detector from Polymer ChAR (Valencia, Spain), Precision Detectors (Amherst, Mass.) 2-angle laser light scattering (LS) detector Model 2040, and a Viscotek (Houston, Tex.) 150R 4-capillary solution viscometer. A GPC with these latter two independent detectors and at least one of the former detectors is sometimes referred to as "3D-GPC or TD-GPC" while the term "GPC" alone generally refers to conventional GPC. Depending on the sample, either the 15° angle or the 90° angle of the light scattering detector is used for calculation purposes. Data collection is performed using Viscotek TriSEC software, Version 3, and a 4-channel Viscotek Data Manager DM400. The system is also equipped with an on-line solvent degassing device from Polymer Laboratories (Shropshire, United Kingdom).

Suitable high temperature GPC columns can be used such as four 30 cm long Shodex HT803 13 micron columns or four 30 cm Polymer Labs columns of 20-micron mixed-pore-size packing (MixA LS, Polymer Labs). The sample carousel compartment is operated at 140° C. and the column compartment is operated at 150° C. The samples are prepared at a concentration of 0.1 grams of polymer in 50 milliliters of solvent. The chromatographic solvent and the sample preparation solvent contain 200 ppm of butylated hydroxytoluene (BHT) in trichloro benzene (TCB). Both solvents are sparged with nitrogen. The polyethylene samples are gently stirred at 160° C. for four hours. The injection volume is 200 microliters. The flow rate through the GPC is set at 1 ml/minute.

The GPC column set is calibrated by running 21 narrow molecular weight distribution polystyrene standards. The molecular weight (MW) of the standards ranges from 580 to 8,400,000, and the standards are contained in 6 "cocktail" mixtures. Each standard mixture has at least a decade of separation between individual molecular weights. The standard mixtures are purchased from Polymer Laboratories. The polystyrene standards are prepared at 0.025 g in 50 mL of solvent for molecular weights equal to or greater than 1,000,000 and 0.05 g in 50 mL of solvent for molecular weights less than 1,000,000. The polystyrene standards were dissolved at 80° C. with gentle agitation for 30 minutes. The narrow standard mixtures are run first and in order of decreasing amount of the highest molecular weight component to minimize degradation. The polystyrene standard peak molecular weights are converted to polyethylene molecular weights using Equation 2 (as described in Williams and Ward, *J. Polym. Sci.*, Polym. Let., 6, 621 (1968)):

$M_{polyethylene} = A \times (M_{polystyrene})^B$ (Eq. 2), where M is the molecular weight of polyethylene or polystyrene (as marked), and B is equal to 1.0. It is known to those of ordinary skill in the art that A may be in a range of about 0.38 to about 0.44 and is determined at the time of calibration using a broad molecular weight distribution polyethylene standard, as outlined in the gpcBR Branching Index by 3D-GPC method, infra, and specifically Equation 9. Use of this polyethylene calibration method to obtain molecular weight values, such as $M_w/M_n$, and related statistics, is defined here as the method of Williams and Ward.

The systematic approach for the determination of multi-detector offsets is performed in a manner consistent with that published by Balke, Mourey, et al. (Mourey and Balke, Chromatography Polym., Chapter 12, (1992)) (Balke, Thitiratsakul, Lew, Cheung, Mourey, Chromatography Polym., Chapter 13, (1992)), optimizing triple detector log ($M_w$ and intrinsic viscosity) results from Dow 1683 broad polystyrene (American Polymer Standards Corp.; Mentor, Ohio) or its equivalent to the narrow standard column calibration results from the narrow polystyrene standards calibration curve. The molecular weight data is obtained in a manner consistent with that published by Zimm (Zimm, B. H., J. Chem. Phys., 16, 1099 (1948)) and Kratochvil (Kratochvil, P., *Classical Light Scattering from Polymer Solutions*, Elsevier, Oxford, N.Y. (1987)). The overall injected concentration used in the determination of the molecular weight is obtained from the mass detector area and the mass detector constant derived from a suitable linear polyethylene homopolymer, or one of the polyethylene standards of known weight average molecular weight. The calculated molecular weights are obtained using a light scattering constant derived from one or more of the polyethylene standards mentioned and a refractive index concentration coefficient, do/dc, of 0.104. Generally, the mass detector response and the light scattering constant should be determined from a linear standard with a molecular weight in excess of about 50,000 daltons. The viscometer calibration can be accomplished using the methods described by the manufacturer or alternatively by using the published values of suitable linear standards such as Standard Reference Materials (SRM) 1475a, 1482a, 1483, or 1484a. The chromatographic concentrations are assumed low enough to eliminate addressing $2^{nd}$ virial coefficient effects (concentration effects on molecular weight).

gpcBR Branching Index by 3D-GPC: In the 3D-GPC configuration, the polyethylene and polystyrene standards can be used to measure the Mark-Houwink constants, K and α, independently for each of the two polymer types, polystyrene and polyethylene. These can be used to refine the Williams and Ward polyethylene equivalent molecular weights in application of the following methods.

The gpcBR branching index is determined by first calibrating the light scattering, viscosity, and concentration detectors as described previously. Baselines are then subtracted from the light scattering, viscometer, and concentration chromatograms. Integration windows are then set to ensure integration of all of the low molecular weight retention volume range in the light scattering and viscometer chromatograms that indicate the presence of detectable polymer from the refractive index chromatogram. Linear polyethylene standards are then used to establish polyethylene and polystyrene Mark-Houwink constants as described previously. Upon obtaining the constants, the two values are used to construct two linear reference conventional calibrations for polyethylene molecular weight and polyethylene intrinsic viscosity as a function of elution volume, as shown in Equations 3 and 4:

$$M_{PE} = \left(\frac{K_{PS}}{K_{PE}}\right)^{1/\alpha_{PE}+1} \cdot M_{PS}^{\alpha_{PS}+1/\alpha_{PE}+1}, \quad \text{(Eq. 3)}$$

and $$[\eta]_{PE} = K_{PS} \cdot M_{PS}^{\alpha+1} / M_{PE}. \quad \text{(Eq. 4)}$$

The gpcBR branching index is a robust method for the characterization of long chain branching as discussed in Yau, Wallace W., "Examples of Using 3D-GPC—TREF for Polyolefin Characterization", Macromol. Symp., 2007, 257, 29-45. The index avoids the slice-by-slice 3D-GPC calculations traditionally used in the determination of g' values and branching frequency calculations in favor of whole polymer detector areas. From 3D-GPC data, one can obtain the sample bulk absolute weight average molecular weight ($M_{w, Abs}$) by the light scattering (LS) detector using the peak area method. The method avoids the slice-by-slice ratio of light scattering detector signal over the concentration detector signal as required in a traditional g' determination.

With 3D-GPC, absolute weight average molecular weight ("$M_{w, Abs}$") and intrinsic viscosity are also obtained independently using Equations 5 and 6:

$$M_W = \sum_i w_i M_i \quad \text{(Eq. 5)}$$

$$= \sum_i \left(\frac{C_i}{\sum_i C_i}\right) M_i$$

$$= \frac{\sum_i C_i M_i}{\sum_i C_i}$$

$$= \frac{\sum_i LS_i}{\sum_i C_i}$$

$$= \frac{LS \text{ Area}}{\text{Conc. Area}}$$

The area calculation in Equation 5 offers more precision because as an overall sample area it is much less sensitive to variation caused by detector noise and GPC settings on baseline and integration limits. More importantly, the peak area calculation is not affected by the detector volume offsets. Similarly, the high-precision sample intrinsic viscosity (IV) is obtained by the area method shown in Equation 6:

$$IV = [\eta] \quad \text{(Eq. 6)}$$

$$= \sum_i w_i IV_i$$

$$= \sum_i \left(\frac{C_i}{\sum_i C_i}\right) IV_i$$

$$= \frac{\sum_i C_i IV_i}{\sum_i C_i}$$

$$= \frac{\sum_i DP_i}{\sum_i C_i}$$

$$= \frac{DP \text{ Area}}{\text{Conc. Area}},$$

where $DP_i$ stands for the differential pressure signal monitored directly from the online viscometer.

To determine the gpcBR branching index, the light scattering elution area for the sample polymer is used to determine the molecular weight of the sample. The viscosity detector elution area for the sample polymer is used to determine the intrinsic viscosity (IV or [η]) of the sample.

Initially, the molecular weight and intrinsic viscosity for a linear polyethylene standard sample, such as SRM1475a or an equivalent, are determined using the conventional calibrations ("cc") for both molecular weight and intrinsic viscosity as a function of elution volume, per Equations 7 and 8:

$$M_{WCC} = \sum_i \left(\frac{C_i}{\sum_i C_i}\right) M_i = \sum_i w_i M_{cc,i}, \quad \text{(Eq. 7)}$$

and $$[\eta]_{CC} = \sum_i \left(\frac{C_i}{\sum_i C_i}\right) IV_i = \sum_i w_i IV_{cc,i}. \quad \text{(Eq. 8)}$$

Equation 9 is used to determine the gpcBR branching index:

$$gpcBR = \left[\left(\frac{[\eta]_{CC}}{[\eta]}\right) \cdot \left(\frac{M_W}{M_{W,CC}}\right)^{\alpha_{PE}} - 1\right], \quad \text{(Eq. 9)}$$

wherein [η] is the measured intrinsic viscosity, $[\eta]_{cc}$ is the intrinsic viscosity from the conventional calibration, $M_w$ is the measured weight average molecular weight, and $M_{w,cc}$ is the weight average molecular weight of the conventional calibration. The weight average molecular weight by light scattering (LS) using Equation (5) is commonly referred to as "absolute weight average molecular weight" or "$M_{w, Abs}$".

The $M_{w,cc}$ from Equation (7) using conventional GPC molecular weight calibration curve ("conventional calibration") is often referred to as "polymer chain backbone molecular weight", "conventional weight average molecular weight", and "$M_{w,GPC}$".

All statistical values with the "cc" subscript are determined using their respective elution volumes, the corresponding conventional calibration as previously described, and the concentration ($C_i$) derived from the retention volume molecular weight calibration. The non-subscripted values are measured values based on the mass detector, LALLS, and viscometer areas. The value of $K_{PE}$ is adjusted iteratively until the linear reference sample has a gpcBR measured value of zero. For example, the final values for α and Log K for the determination of gpcBR in this particular case are 0.725 and -3.355, respectively, for polyethylene, and 0.722 and -3.993 for polystyrene, respectively.

Once the K and α values have been determined using the procedure discussed previously, the procedure is repeated using the branched samples. The branched samples are analyzed using the final Mark-Houwink constants as the best "cc" calibration values and Equations 5-8 are applied.

The interpretation of gpcBR is as follows: For linear polymers, gpcBR calculated from Equation 9 will be close to zero since the values measured by LS and viscometry will be close to the conventional calibration standard. For branched polymers, gpcBR will be higher than zero, especially with high levels of long chain branching, because the measured polymer molecular weight will be higher than the calculated $M_{w,cc}$, and the calculated $IV_{cc}$ will be higher than the measured polymer IV. In fact, the gpcBR value represents the fractional IV change due the molecular size contraction effect as the result of polymer branching. A gpcBR value of 0.5 or 2.0 would mean a molecular size contraction effect of IV at the level of 50% and 200%, respectively, versus a linear polymer molecule of equivalent weight.

For these particular Examples, the advantage of using gpcBR in comparison to a traditional "g' index" and branching frequency calculations is due to the higher precision of gpcBR. All of the parameters used in the gpcBR index determination are obtained with good precision and are not detrimentally affected by the low 3D-GPC detector response at high molecular weight from the concentration detector. Errors in detector volume alignment also do not affect the precision of the gpcBR index determination.

Zero Shear Viscosity: Specimens for creep measurements were prepared on a programmable Tetrahedron bench top press. The program held the melt at 177° C. for 5 minutes at a pressure of $10^7$ Pa. The chase was then removed to the bench to cool down to room temperature. Round test specimens were then die-cut from the plaque using a punch press and a handheld die with a diameter of 25 mm. The specimen is about 1.8 mm thick.

Zero-shear viscosities are obtained via creep tests that were conducted on an AR-G2 stress controlled rheometer (TA Instruments; New Castle, Del.) using 25-mm-diameter parallel plates at 190° C. Two thousand ppm of antioxidant, a 2:1 mixture of IRGAFOS 168 and IRGANOX 1010 (Ciba Specialty Chemicals; Glattbrugg, Switzerland), is added to stabilize each sample prior to compression molding. The rheometer oven is set to test temperature of 190° C. for at least 60 minutes prior to zeroing fixture. At the testing temperature a compression molded sample disk is inserted between the plates and allowed to come to equilibrium for 5 minutes. The upper plate is then lowered down to 50 μm above the desired testing gap (1.5 mm). Any superfluous material is trimmed off and the upper plate is lowered to the desired gap. Measurements are done under nitrogen purging at a flow rate of 5 L/min. The default creep time is set for 6 hours.

A low shear stress of 5 to 20 Pa is applied for all of the samples to ensure that the steady state shear rate is low enough to be in the Newtonian region. Steady state is determined by taking a linear regression for all the data in the last 10% time window of the plot of log(J(t)) vs. log(t), where J(t) is creep compliance and t is creep time. If the slope of the linear regression is greater than 0.97, steady state is considered to be reached, then the creep test is stopped. In all cases in this study the samples reached steady state within 6 hours. The steady state shear rate is determined from the slope of the linear regression of all of the data points in the last 10% time window of the plot of ε vs. t, where ε is strain. The zero-shear viscosity is determined from the ratio of the applied stress to the steady state shear rate.

A dynamic oscillatory shear test is conducted before and after the creep test on the same specimen from 0.1 to 100 rad/s at 10% strain. The complex viscosity values of the two tests are compared. If the difference of the viscosity values at 0.1 rad/s is greater than 5%, the sample is considered to have degraded during the creep test, and the result is discarded.

Total Sulfur Concentration: The total concentration of sulfur found in the ethylene-based polymer product—both molecularly bonded to the ethylene-based polymer and "free" sulfur (i.e., sulfur contained in byproduct and other compounds homogeneously incorporated with the ethylene-based polymer)—is determined by X-ray fluorescence (XRF) using an Axios-Petro X-ray fluorescence (XRF) spectrometer with a Rh tube from PANalytical GmbH (Kassel-Waldau, Germany). The XRF spectrometer is calibrated by using a standard of 1000 μs/kg S in mineral oil (Cat. No. ORG-S8-2Z; Spex Certiprep; Metuchen, N.J.) and clean oil (Standard oil; Merck KGaA, Darmstadt, Germany). It is understood that the letter "S" in this instance refers to elemental sulfur. The XRF-method has a sulfur detection threshold of 5 ppm by weight based upon the brutto intensities of the standards. All standards and samples were measured in sample cups covered with a polypropylene-based film. For each measurement, approximately 3 g of ethylene-based polymer is hot pressed into a 31 mm diameter disk, resulting in a specimen about 4 mm thick. The sample disks are then secured in the center of the sample cup with a centering ring for testing. The XRF spectrometer is set to the conditions listed in Table 1 for each test and the test performed.

TABLE 1

XRF spectrometer conditions for each Total Sulfur Concentration test.

| Attribute | Setting |
|---|---|
| Channel | S |
| Line | KA |
| Crystal | Ge 111-C |
| Collimator | 300 μm |
| Collimator mask | 27 mm |
| Detector | Flow |
| Tube filter | Be (150 μm) |
| kV | 25 |
| mA | 96 |
| Angle (°2T) | 110.6620 |
| Offset Background1 (°2T) | 1.0000 |
| Offset Background2 (°2T) | −1.6000 |
| Measurement time | 10 s (for each channel) |
| Background method | Calculated factors |

The background corrected intensities were exported into the matrix correction program "Personal Computer Fundamental Parameters for Windows" by Fundex Software and Technology, Inc. (Northridge, Calif.). A linear calibration curve based upon sulfur concentration is determined from the intensity responses from the oil and sulfur standards. The linear calibration curve is used to calculate the total sulfur concentration in each sample. The composition of the floater was set to $C_1H_2$.

Surface and Internal Haze: Samples measured for internal haze and overall haze are sampled and prepared according to ASTM D 1003. A Hazegard Plus (BYK-Gardner USA; Columbia, Md.) is used for testing. Surface haze is determined as the difference between overall haze and internal haze. Surface haze tends to be related to the surface roughness of the film, where surface haze increases with increasing surface roughness. The surface haze to internal haze ratio is the surface haze value divided by the internal haze value.

Blown Film Fabrication Conditions: The sample films are extrusion blown films produced on a 45 mm COVEX Monolayer Blown Film Line (Barcelona, Spain) using the conditions in Table 2.

TABLE 2

Extrusion blown film processing conditions for producing samples used in Surface and Internal Haze tests.

| Variable | Unit | Value |
| --- | --- | --- |
| Air Temperature at cooling ring | ° C. | 23 |
| Amps | A | 23 |
| Average Thickness | Um | 50 |
| B.U.R. (Blow Up Ratio) | — | 2.5 |
| Die gap | Mm | 1 |
| Frost line height | Mm | 300 |
| Layflat | Mm | 584 |
| Line Speed | m/min | 9.5 |
| Melt Pressure, Adapter | Bar | 0 |
| Melt Pressure, Barrel | Bar | 203 |
| Melt Temperature, Adapter | ° C. | 213 |
| Melt Temperature, Barrel | ° C. | 194 |
| Output Rate | kg/h | 29 |
| RPM | Rpm | 77 |
| Volts | V | 250 |

Figure 2:
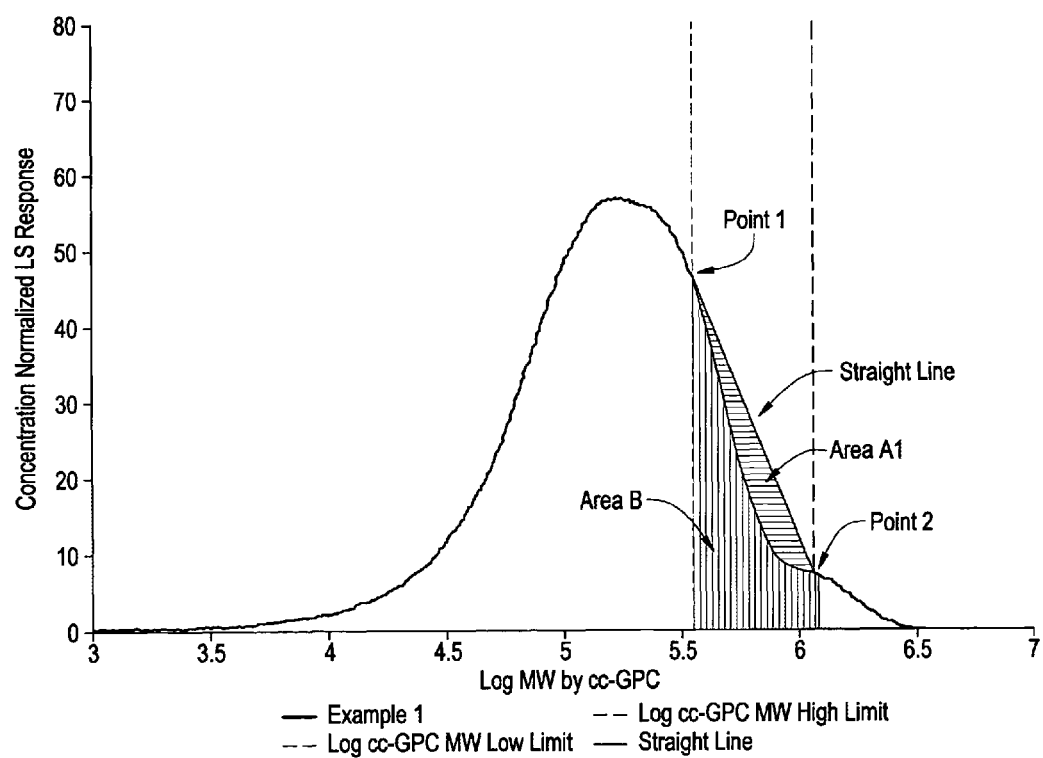
FIG. 2 is a concentration-normalized light scattering (LS) chromatograph curve for a range of log conventionally calibrated GPC molecular weight and parts of the GPC-LS Characterization analysis for Example 1.

GPC-LS Characterization: Analysis of a concentration-normalized LS chromatogram response curve for a particular sample using a pre-determined molecular weight range is useful in differentiating the embodiment polymers from analogous and commercially available comparative low density ethylene-based polymers. The "GPC-LS Characterization" parameter, Y, is designed to capture the unique combination of molecular weight distribution (MWD) and the GPC-LS profile for a specific material. The properties of interest are melt index ($I_2$), MWD, long chain branching, and haze. Desirable attributes for a polymer with a low haze are higher melt index ($I_2$), narrower MWD, and lower long chain branching values. All in all, the GPC-LS Characterization value is designed to capture the features of low long chain branching, narrow MWD, and high melt index ($I_2$). FIG. 2 provides an example and guide for using the GPC-LS Characterization method to identify inventive embodiments.

An ethylene-based polymer that has long chain branching, such a low density ethylene-based polymers, can be differentiated by using an analysis technique called "GPC-LS Characterization". In the GPC-LS Characterization method, the determination is made using the light scattering (LS) detector response for a sample processed by a conventionally calibrated 3D-GPC ("cc-GPC") over a range of molecular weights of the sample. The molecular weights of the sample are converted to logarithm values for scaling purposes. The LS response is "concentration-normalized" so the LS response can be compared between samples, as it is known in the art that the unnormalized LS signals can vary greatly from sample to sample without normalization. When plotted, the logarithm values of range of the cc-GPC molecular weights and the concentration-normalized LS values form a concentration-normalized LS chromatogram curve such as the one shown in FIG. 2.

Once the concentration-normalized LS chromatogram curve is available, the determination of the GPC-LS Characterization value is straightforward. In the GPC-LS Characterization method, a GPC-LS Characterization value (Y) is determined using the following equation:

$$Y=(0-x)*(A/B) \qquad (\text{Eq. 10}).$$

Essentially, the GPC-LS Characterization value is a relationship between two associated areas (A and B) and an indexed slope of a line (x) between two points on the concentration-normalized LS chromatogram curve at the logarithmic values of two specified cc-GPC molecular weight values. The specified cc-GPC molecular weight values attempt to bracket a molecular weight fraction that is known to contain polymer chains with long chain branching.

The first step in the analysis is generation of the concentration-normalized LS chromatogram curve representing concentration-normalized LS response values versus the logarithmic values of cc-GPC molecular weights for the polymer being examined.

The second step is to draw a straight line between two points on the concentration-normalized LS chromatogram curve. The straight line and the points will provide the basis for determination of areas A and B. The two points, a first point and a second point, are located on the concentration-normalized LS chromatogram curve and represent the concentration-normalized LS response values (a first and a second concentration-normalized LS response values) at the logarithm values for two cc-GPC molecular weight values (a first and a second logarithmic cc-GPC molecular weight values). The first point (Point 1 on FIG. 2) is defined as being on the concentration-normalized LS chromatogram curve (representing the first concentration-normalized LS response value) corresponding to the logarithm value of cc-GPC molecular weight 350,000 grams/mole (representing the first logarithmic cc-GPC molecular weight value), which is a value of approximately 5.54. The second point (Point 2 on FIG. 2) is defined as being along the concentration-normalized LS chromatogram curve at the concentration-normalized LS response value (representing the second concentration-normalized LS response value) corresponding to a logarithm value of cc-GPC molecular weight 1,150,000 grams/mole (representing the second logarithmic cc-GPC molecular weight value), which is a value of approximately 6.06. It is known in the art that differentiation in long chain branching typically is shown around 1M grams/mole cc-GPC molecular weight.

The third step is to determine the area A between the straight line and the concentration-normalized LS chromatogram curve between the two logarithmic cc-GPC molecular weight values. Area A is defined as being the value of A1 minus A2. In preferred embodiments, the area A is defined for the range of values between the logarithm value of cc-GPC molecular weight 350,000 grams/mole and the logarithm value of cc-GPC molecular weight 1,150,000 grams/mole.

A1 is defined as the area bound between the straight line and the normalized LS chromatogram curve where the concentration-normalized LS response value of the straight line is greater than the concentration-normalized LS response value for the concentration-normalized LS chromatogram curve between the two logarithmic cc-GPC molecular weight values.

As can be seen in FIG. 2, the area defined as A1 fills the entire range between the two logarithmic cc-GPC molecular weights; therefore A=A1. In many cases the straight line will be "above" the concentration-normalized LS chromatogram curve for the logarithmic cc-GPC molecular weight range and will not intersect with the concentration-normalized LS chromatogram curve except at Points 1 and 2. In these cases, A=A1 and A2=0. In some embodiments, however, A is not equal to A1. The concentration-normalized LS chromatogram curve shown in FIG. 3 shows an example of when this may occur.

Figure 3:
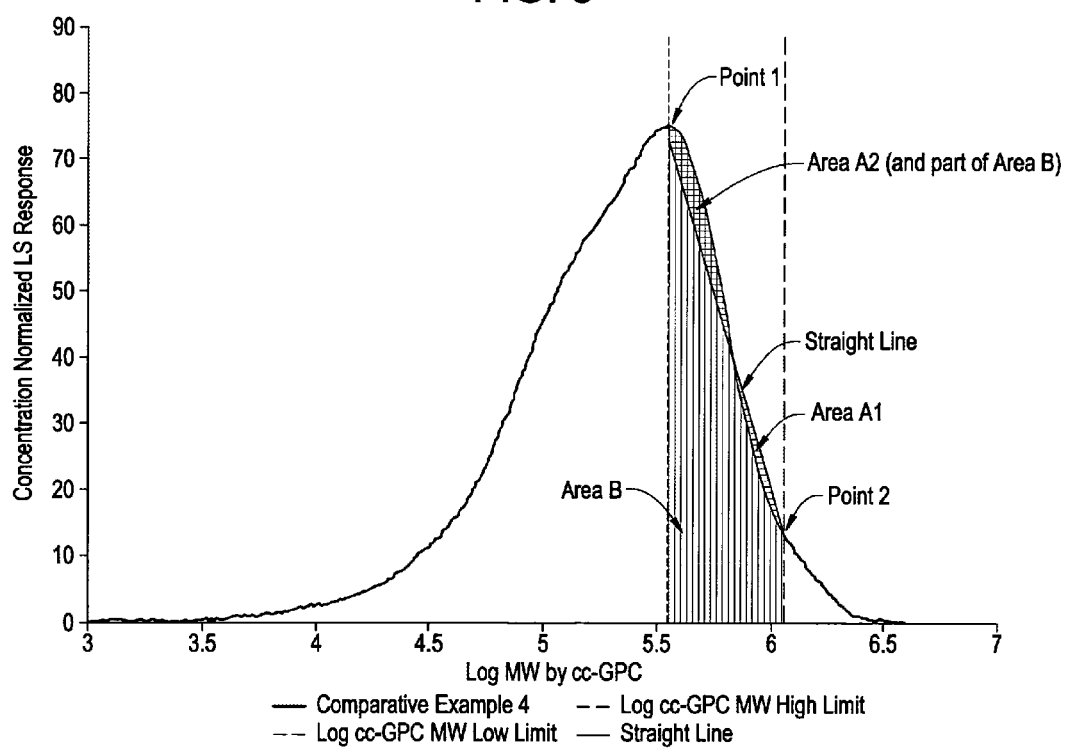
FIG. 3 is a concentration-normalized light scattering (LS) chromatograph curve for a range of log conventionally calibrated GPC molecular weight and parts of the GPC-LS Characterization analysis for Comparative Example 4.

In some embodiments, as can be seen in FIG. 3, the straight line may intersect with the concentration-normalized LS chromatogram curve in at least one other point besides Points 1 and 2 (see FIG. 3 at "Straight Line Intersection"). In such situations, A1 is determined as previously defined. For the example shown in FIG. 3, A1 would be the area between the concentration-normalized LS chromatogram curve and the straight line between the logarithm cc-GPC molecular weight value of approximately 5.8 to the logarithm value of cc-GPC molecular weight 1,150,000 grams/mole.

A2 is defined as the inverse of A1. A2 is the area bound between the straight line and the concentration-normalized LS chromatogram curve where the concentration-normalized LS response of the straight line is less than the concentration-normalized LS response for the concentration-normalized LS chromatogram curve between the two logarithmic cc-GPC molecular weight values. For the example shown in FIG. 3, A2 is the area between the concentration-normalized LS response curve and the straight line between the logarithm cc-GPC molecular weight value of approximately 5.8 to the logarithm value of cc-GPC molecular weight 350,000 grams/mole.

In calculating a total value for A, A is again defined as the area A1 minus the area A2. In some embodiments, as can be seen graphically in FIG. 3, A may result in a negative value, reflecting that the straight line defines more of an area below the concentration-normalized LS response curve than above it.

The fourth step is to determine the area B under the concentration-normalized LS chromatogram curve for the logarithmic cc-GPC molecular weight range. B is defined as the area under the concentration-normalized LS chromatogram curve between the two logarithmic cc-GPC molecular weight values. Area B does not depend upon the analysis of area A.

The fifth step is to determine the value of x, the slope indexing value. The value of the x is an indexing factor that accounts for the slope of the straight line established for determining areas A and B. The value of x is not the slope of the straight line; however, it does represent a value reflective of the difference between Points 1 and 2. The value of x is defined by Equation 11:

$$x = \frac{\frac{LSresponse_{(Point2,CN)} - LSresponse_{(Point1,CN)}}{LSresponse_{(Point2,CN)}}}{\log MW_{(Point2,ccGPC)} - \log MW_{(Point1,ccGPC)}},$$ (Eq. 11)

where "LS response" are the concentration-normalized LS response values for Points 1 and 2, respectively, and "log MW" are the logarithmic cc-GPC molecular weights for Points 1 and 2, respectively. In preferred embodiments, the value of x is negative, indicating the straight line is downward sloping. In some embodiments, the straight line may intersect the normalized LS chromatogram curve at least once between Points 1 and 2.

Finally, once x, A, and B are established, the GPC-LS Characterization value (Y) is determined using the previously presented Equation 10:

$$Y=(0-x)*(A/B)$$ (Eq. 10).

When examining a LS chromatogram response curve, it is known that the size of the LS peak at about log MW 6 is related to the level of long chain branching in the polymer. The smaller the log MW 6 LS peak is, the value of the slope of the line segment in the LS plot becomes more negative because the line is more steeply angled. This results in a more negative indexed slope of a line (x) value. A more negative x-value contributes to a higher positive value of Y, given the relationship in Equation 10.

The other term that contributes to Y in Equation 10 is the area ratio of A/B. The higher the A/B ratio gives, the higher the Y value. This ratio is affected by the melt index ($I_2$) and the MWD values of the polymer. These two values in turn affect how far the main polymer peak is pulled away from the LS pre-peak near the Log MW of 6 high MW region. A higher melt index ($I_2$) value means a lower MW, indicating a more distinct separation between the two response peaks. This would create a deeper valley between the high and low MW fractions. A deeper valley creates a larger area beneath the line segment, designated as "A". A narrow MWD means a less broad LS response curve and has the similar effect of creating a deeper valley in the plot, and again a larger area A.

Extrusion Multi-pass: A relative measurement of atmospheric stability (that is, resistance to oxidative attack and degradation) of two or more resins may be tested by passing polymer samples through a heated extruder several times under atmospheric conditions and then testing for physical characteristics such as melt index ($I_2$) after each pass.

The polymer samples are processed through a LEISTRIZ micro-18 twin-screw extruder (obtained from American Leistritz Extruder Corporation, Somerville, N.J.). The extruder is controlled and driven by a HAAKE™ PolyLab System (Thermo Fischer Scientific; Waltham, Mass.) computer system. The extruder consists of 6 heating zones of 90 mm length each, and a heated die with a 3 mm strand orifice. The first zone is the feed throat and is jacket cooled with flowing water to prevent bridging of the feed polymer. The first zone is equipped with an open cone to receive the polymer feed from a K-TRON KV2T20 twin auger feeder (Pitman, N.J.). The five heated zones are set at 135, 165, 200, 220, and 220° C., respectively. The die at the end of the extruder is heated to 220° C.

Each screw has a diameter of 18 mm and a length of 540 mm, resulting in an L/D ratio of 30. The screw stack for the first five zones consists of an open forwarding design with a 30 degree pitch (off vertical). The final zone of the screw stack is a slightly narrower pitched forwarding design with a pitch of 20 degrees (off vertical). The overall screw design imparts little shear to the polymer and primarily forwards the material through the heated barrel sections. The molten polymer is compressed near the end of the screw through the tighter pitched element to provide enough back pressure to force the molten material through the die.

When processing, the screws turns at 250 rotations per minute (rpm). The polymer is fed to the extruder by the feeder with enough polymer to process as many passes as necessary while permitting the acquisition of a sample, preferably about 50 grams, after each pass for analysis.

The resultant molten polymer strand is delivered into a chilled water bath where it solidifies. After solidification, the polymer strand passes through an air knife to remove water before being cut by a strand chopper into polymer pellets. Upon pellitization, the sample for analysis is obtained before returning the remainder back into the feeder for additional processing if necessary.

EXAMPLES

The invention is further illustrated by means of the following, non-limiting examples. In discussing the Examples and Comparative Examples, several terms are defined. There are two Example compositions and sets of process information for their creation: Example 1 and Example 2. There are three Comparative Examples compositions and sets of process information. The process runs that created Comparative Examples 1, 2, and 3 are analogous in that they are produced using the same process train as Examples 1 and 2. Comparative Examples 1 and 2 are directly comparative with Examples 1 and 2, respectively. The disclosed information regarding Comparative Example 3 is generally comparative in that the conditions are similar, but not comparative, to both Examples 1 and 2, and the process is analogous (same process train). Process information on Comparative Examples 1, 2, and 3 are available infra.

In addition to Comparative Examples 1-3, several "commercial" Comparative Examples (Comparative Examples 4, 5, 6, et seq.) are also used for comparison purposes related to material properties. "Commercial" comparative examples, as they may sometimes be referred to, are LDPE materials that are generally available "off the shelf" and are commercially sold or are grades of LDPE that have been produced in small quantities in a laboratory that, if properly scaled up, could be produced and sold commercially.

When process conditions are discussed and compared, the process conditions may be referred to by their product designation (e.g., process conditions for producing Example 1 product may be referred to as "the process of Example 1").

Figure 4:
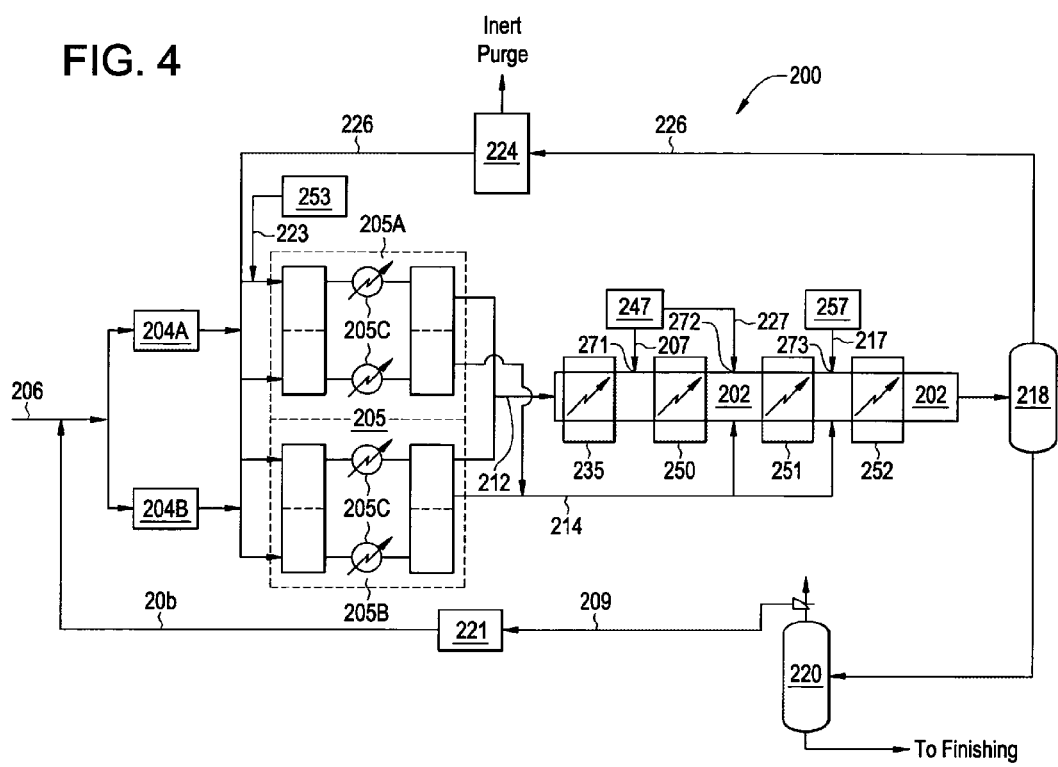
FIG. 4 is a diagram of the process reaction system 200 that is used to manufacture Examples 1 and 2 as well as Comparative Examples 1-3.

Examples 1 and 2 as well as Comparative Examples 1, 2, and 3 are produced on the same process reaction system; therefore, in referring to the same equipment between the runs, the physical process and its units are analogous to one another. FIG. 4 is a simple block diagram of the process reaction system 200 used to produce the aforementioned Examples and Comparative Examples.

Process reaction system 200 in FIG. 4 is a partially closed-loop dual recycle high-pressure, low density polyethylene production system. Process reaction system 200 is comprised of a fresh ethylene feed conduit 206; parallel primary compressors 204A and 204B; hypercompressor 205, which is made up of two parallel hypercompressors 205A and 205B, each further comprised of a first compression stage and a second compression stage with intercoolers 205C in-between each compression stage; a tube reactor 202; a first reaction zone feed conduit 212; a downstream reaction zones feed conduit 214; a first peroxide initiator conduit 207 connected to a first peroxide initiator source 247; a second peroxide initiator conduit 287 connected to the first peroxide initiator source 247; a third peroxide initiator conduit 217 connected to a second peroxide initiator source 257; first (230), second (231), and third (232) cooling jackets (using water) mounted around the outer shell of the tube reactor 202; a preheater 235 mounted around the outer shell at the front of the tube reactor 202; a high pressure separator 218; a high pressure recycle line 226; a high pressure recycle system 224; a low pressure separator 220; a low pressure recycle line 208; a booster compressor 221; and a CTA feed conduit 223 connected to a CTA feed source 253.

Tube reactor 202 further comprises three reaction zones demarcated by the location of peroxide injection points. Tube reactor 202 has a length of about 1540 meters. The first reaction zone feed conduit 212 is attached to the front of the tube reactor 202 at 0 meters and feeds a portion of the process fluid into the first reaction zone. The first reaction zone starts at injection point #1 (271), which is located about 120 meters downtube of the front of the tube reactor 202 and ends at injection point #2 (272). The first peroxide initiator conduit 207 is connected to the tube reactor 202 at injection point #1 (271). The second reaction zone starts at injection point #2 (272), which is about 520 meters downtube from the front of the tube reactor 202. A branch from the downstream reaction zones feed conduit 214, feeding a portion of the process fluid directly to the second reaction zone, and the second peroxide initiator conduit 287 are connected to the tube reactor 202 at injection point #2 (272). The second reaction zone ends at injection point #3 (273). The third reaction zone starts at injection point #3 (273), which is located about 980 meters downtube from the front of the tube reactor 202. A branch from the downstream reaction zones feed conduit 214 is connected slightly uptube—about 10 meters—from injection point #3 (273) and feeds a portion of the process fluid to the third reaction zone.

The preheater 235 and the first reaction zone of the tube reactor 202 have a diameter of 4 centimeters. The second reaction zone of the tube reactor 202 has a diameter of 6 centimeters. The third reaction zone of the tube reactor 202 has a diameter of 6 centimeters.

For all the Examples and the Comparative Examples 1-3, approximately 50% of the process fluid is directed to the first reaction zone via the first reaction zone feed conduit 212. Approximately 35% of the process fluid is directed to the second reaction zone via the downstream reaction zones feed conduit 214. The remaining process fluid is directed to the third reaction zone via the downstream reaction zones feed conduit 214.

For all the Examples and the Comparative Examples 1-3, a mixture containing t-butyl peroxy-2 ethylhexanoate (TBPO), di-t-butyl peroxide (DTBP), and an n-paraffin hydrocarbon solvent (180-240° C. boiling range) is used as the initiator mixture for the first (271) and second (272) injection points. For injection point #3 (273), a mixture containing DTBP and the n-paraffin hydrocarbon solvent is used. Table 3 shows the weight of the peroxide initiator solution used for each of the trial runs.

TABLE 3

Peroxide initiator mass flow rates in kilograms per hour at each injection point used to produce the Examples 1-2 and Comparative Examples 1-3.

| Organic peroxide (PO) | | Example 1 | Comparative Example 1 | Example 2 | Comparative Example 2 | Comparative Example 3 |
|---|---|---|---|---|---|---|
| Injection Location | Material | (kg/hr) | (kg/hr) | (kg/hr) | (kg/hr) | (kg/hr) |
| Injection Point #1 | TBPO | 0.89 | 0.86 | 0.89 | 0.87 | 0.86 |
| Injection Point #1 | DTBP | 0.37 | 0.36 | 0.38 | 0.37 | 0.36 |
| Injection Point #2 | TBPO | 1.30 | 1.35 | 1.69 | 1.69 | 1.22 |
| Injection Point #2 | DTBP | 0.55 | 0.57 | 0.71 | 0.71 | 0.52 |
| Injection Point #3 | TBPO | 0.00 | 0.00 | 0.00 | 0.00 | 0.00 |
| Injection Point #3 | DTBP | 0.63 | 0.64 | 0.79 | 0.78 | 0.59 |

For Examples 1 and 2, a blend of two chain transfer agents—one CTA with a Cs less than one (propionaldehyde or "PA") and one CTA with a Cs greater than one (tert-dodecyl mercaptan or "TDM")—are injected into the process fluid at the inlet of parallel hypercompressor 205A. The TDM is Sulfole® 120 Mercaptan from Chevron Philips Chemical Co. of The Woodlands, Texas. When using more than one CTA in the disclosed process, the CTAs are pumped individually and mixed together inline. By being fed into the inlet of parallel hypercompressors 205A, the CTA mixtures for Examples 1 and 2 are fed only to the front of the tube reactor 202 via first reaction zone feed conduit 212. Comparative Examples 1 and 2 are also "front fed" to the tube reactor 202 in the same manner; however, only PA is fed during those process runs. Comparative Example 3, like Comparative Examples 1 and 2, only uses PA as its chain transfer agent, but the process of Comparative Example 3 does not feed the entire amount of CTA to the front of the tube reactor 202. Although not shown in FIG. 4, a portion of the CTA feed for Comparative Example 3 is fed to the second and third reaction zones. This is accomplished by injecting a portion of the CTA feed to the inlet of parallel hypercompressors 205B. As previously discussed, the process fluid discharge of parallel hypercompressor 205B is fed into the second and third reaction zones using the downstream reaction zones feed conduit 214.

The amounts and compositions of the CTA feeds to the comparative processes are the only control variables changed between the comparative process runs of Examples 1 and 2 and Comparative Examples 1 and 2. The other controlled process variables are set at comparable values for the four runs.

Table 4 shows the amounts and composition of the chain transfer agents that are used in the disclosed process.

TABLE 4

Chain transfer agent mass flow rates for Examples 1 and 2 and Comparative Examples 1, 2, and 3. Note that "Front Feed" refers to the CTAs being fed to the reactor tube via the first reaction zone feed conduit and that "Downstream Feed" refers to the CTAs being fed to the reactor tube via the downstream reaction zones feed conduit.

| Chain Transfer Agent Addition Location | Example 1 (kg/hr) | Comparative Example 1 (kg/hr) | Example 2 (kg/hr) | Comparative Example 2 (kg/hr) | Comparative Example 3 (kg/hr) |
|---|---|---|---|---|---|
| CTA-types | PA + TDM | PA | PA + TDM | PA | PA |
| PA - Front Feed | 15.5 | 22.6 | 15.1 | 23.0 | 19.5 |
| PA - Downstream Feed | 0.0 | 0.0 | 0.0 | 0.0 | 4.0 |
| TDM - Front Feed | 14.0 | 0.0 | 14.0 | 0.0 | 0.0 |
| TDM - Downstream Feed | 0.0 | 0.0 | 0.0 | 0.0 | 0.0 |

The mass flow rate, in kg/hour, of the chain transfer agents into the tube reactor 202 depends on many factors, such as expense and solubility, but most notably the relative chain transfer constants of the two or more CTAs. For example, in Example 1 and 2, the mass flow rate of the chain transfer agent having a Cs greater than 1 (TDM) is lower than the mass flow rate of the chain transfer agent having a Cs greater than 1 (PA).

The molar flow rate, in kg/mol, of a chain transfer agent is related to the mass flow rate by taking the mass flow rate of the CTA and dividing by the CTA's molecular weight in kg/mol. For example, the molecular weight of PA is 0.058 kg/g-mol. The molecular weight of TDM is 0.201 kg/g-mol.

The reactor tube process conditions used to manufacture Examples 1 and 2 and Comparative Examples 1, 2, and 3 are given in Table 5.

TABLE 5

Production conditions and results for Examples 1 and 2 and Comparative Examples 1, 2, and 3.
Note that "CJW" means "cooling jacket water".

| Trial Run | Units | Example 1 | Comparative Example 1 | Example 2 | Comparative Example 2 | Comparative Example 3 |
|---|---|---|---|---|---|---|
| Reactor Inlet Pressure | Bar | 2331 | 2329 | 2330 | 2330 | 2320 |
| Reaction Zone 1 - Initiation Temperature | °C. | 140.0 | 140.0 | 140.0 | 140.0 | 145.0 |
| Reaction Zone 1 - Peak Temperature | °C. | 284.7 | 285.1 | 286.8 | 287.1 | 287.7 |
| Reaction Zone 1 - Outlet Temperature | °C. | 201.4 | 204.6 | 201.7 | 205.2 | 203.4 |
| Downstream Process Fluid Temperature | °C. | 70.3 | 65.9 | 69.1 | 64.1 | 67.7 |
| Reaction Zone 2 - Initiation Temperature | °C. | 150.1 | 149.8 | 150.0 | 149.9 | 150.0 |
| Reaction Zone 2 - Peak Temperature | °C. | 290.4 | 290.2 | 295.6 | 295.3 | 287.3 |
| Reaction Zone 2 - Outlet Temperature | °C. | 228.8 | 230.5 | 231.3 | 232.5 | 229.5 |
| Reaction Zone 3 - Initiation Temperature | °C. | 211.2 | 214.0 | 213.5 | 214.9 | 213.0 |
| Reaction zone 3 - Peak Temperature | °C. | 290.2 | 289.7 | 295.1 | 294.6 | 288.0 |
| Inlet Water Temperature - CJW | °C. | 168.6 | 168.6 | 168.9 | 168.9 | 168.7 |
| Delta T - CJW - Reaction Zone 1 | °C. | 21.4 | 20.9 | 21.3 | 20.9 | 21.7 |
| Delta T - CJW - Reaction Zone 2 | °C. | 23.1 | 23.0 | 24.4 | 24.0 | 22.2 |
| Delta T - CJW - Reaction Zone 3 | °C. | 10.8 | 10.8 | 10.8 | 10.8 | 10.7 |
| Flow rate - CJW - Reaction Zone 1 | MT/hr | 100 | 100 | 100 | 100 | 100 |
| Flow rate - CJW - Reaction Zone 2 | MT/hr | 120 | 120 | 120 | 120 | 120 |
| Flow rate - CJW - Reaction Zone 3 | MT/hr | 210 | 210 | 210 | 210 | 210 |
| Fresh Ethylene Feed | MT/hr | 15.6 | 15.4 | 16.1 | 15.9 | 15.2 |
| Ethylene Throughput in Tube Reactor | MT/hr | 55.7 | 56.0 | 55.9 | 56.1 | 56.0 |
| Ethylene Conversion | % | 27.7 | 27.3 | 28.4 | 28.0 | 26.9 |
| Polyethylene Production Rate | MT/hr | 15.4 | 15.3 | 15.9 | 15.7 | 15.0 |

It can be observed from the data given in Table 5 that evidence exists of the effects of the suppression of high-molecular weight polymer chains early in the process due to the presence of the high-Cs chain transfer agents. As shown in Table 4, the high-Cs chain transfer agent, TDM, is only fed to the process—and only to the front part of the process—during the runs for Examples 1 and 2. At the process conditions reported in Table 5, TDM, the high-Cs chain transfer agent, has a Cs greater than 1 but less than 100, and that of PA, the low-Cs CTA, has a Cs less than 1 but greater than 0.05.

As for the process condition comparison between Example 1 and Comparative Example 1, Example 2 and Comparative Example 2, it can be seen through Tables 3-5 that except for the CTA feeds and amounts, the conditions were comparable. As shown in Table 5, the process conditions for Examples 1 and 2 indicate suppression of high-molecular weight polymers chains through improved processing conditions in the first and second reaction zones. The Comparative Examples 1 and 2 each show a higher "Reaction Zone 1—Outlet Temperature" and lower "Delta T—CJW—Reaction Zone 1" temperature differential versus the analogous and comparable Example process runs. Given that the "Inlet Water Temperature—CJW" and the "Flow rate—CJW—Reaction Zone 1" are held steady for all four runs, it is easy to conclude that there is better heat transfer in Reaction Zone 1 during the two Example runs than from the two Comparative Example runs.

The improvement in heat transfer of Reaction Zone 1 has a positive energy impact upon the rest of the reaction system. For all the runs, the initiation temperature for the second reaction zone is targeted to be around 150° C. Given that the "Reaction Zone 1—Outlet Temperature" is higher than this temperature target, the process fluid in the downstream reaction zones feed conduit 214 is cooled before injection into the reactor tube 202 at injection point #2 (272) just enough to offset the reaction system temperature and reach the temperature target. Because the "Reaction Zone 1—Outlet Temperature" for each Example is relatively cooler than its analogous Comparative Example, the process fluid in the downstream reaction zones feed conduit 214 does not have to be cooled as much to offset the reaction system temperature at this point to meet the temperature target. This is seen in the "Downstream Process Fluid Temperature" value, which is the temperature of the process fluid injected into the reactor tube 202 fed through the downstream reaction zones feed conduit 214. For the Examples, this temperature value is slightly higher than the same value for the Comparative Examples because not as much reaction system cooling is required via injection of additional process fluid at injection point #2 (272) to offset the reaction system temperature to meet the 150° C. target (as is further illustrated by the "Reaction Zone 2—Initiation Temperature" value).

Similar improved performance is seen in the second and third reaction zones. In the second reaction zone, "Reaction Zone 2—Outlet Temperature" is lower and "Delta T—CJW—Reaction Zone 2" is higher, indicating improved heat transfer in the second reaction zone for the Examples over the analogous Comparative Examples. This also leads to a lower "Reaction Zone 3—Initiation Temperature" for the Examples, as the final part of the process fluid is injected into to the process. This results in a broader temperature differential between "Reaction Zone 3-Initiation Temperature" and "Reaction zone 3—Peak Temperature" for the Examples over the Comparative Examples, indicating a higher amount of ethylene conversion occurring in this zone.

The final indication regarding process improvement is the ethylene consumption and polyethylene production. As shown in Table 5, "Fresh Ethylene Feed", "Ethylene Conversion", and "Polyethylene Production Rate" are all higher as a result of improved overall heat removal capability in the tube reaction system.

Upon closer inspection of the data in Table 5, the disclosed processes would show an even greater difference between ethylene conversion and production rate values if the Downstream Process Fluid Temperatures of the Examples and Comparative Examples were forced to be closer together and more comparable. Comparing Example 1 and Comparable Example 1, the difference between the Ethylene Conversion values is 0.4%, favoring Example 1. Forcing the Downstream Process Fluid Temperature of Comparative Example 1 to be a higher temperature closer to the value for Example 1 would result in a higher Comparative Example 1 Reaction Zone 3—Initiation Temperature because the temperature is not controlled, unlike the Reaction Zone 2—Initiation Temperatures. The higher initiation temperature for the third zone of Comparative Example 1 would result in a drop in the overall ethylene conversion efficiency. The same trend would hold for Example 2 and Comparative Example 2.

Examples and Comparative Examples Characterization

3D-GPC analysis is performed on the product polymers of Examples 1 and 2 and Comparative Examples 1, 2, and 3. Additionally, Comparative Example 4 is a commercially available LDPE material and Linear Standard 1 is a 1 MI linear polyethylene standard. These results are summarized in Tables 6-8; in these tables a "GPC" subscript refers to a conventional calibration measurements and "abs" refers to absolute (light scattering) measurement.

TABLE 6

Conventional GPC analysis of Examples 1-2 and Comparative Examples 1-4.

| Sample | $M_{n,GPC}$ (g/mol) | $M_{w,GPC}$ (g/mol) | $M_{z,GPC}$ (g/mol) | $(M_w/M_n)_{GPC}$ |
|---|---|---|---|---|
| Example 1 | 15,990 | 79,330 | 186,100 | 4.96 |
| Comparative Example 1 | 14,140 | 81,400 | 207,300 | 5.76 |
| Example 2 | 15,620 | 81,820 | 195,200 | 5.24 |
| Comparative Example 2 | 15,560 | 85,190 | 227,300 | 5.47 |
| Comparative Example 3 | 15,470 | 80,960 | 206,600 | 5.23 |
| Comparative Example 4 | 15,350 | 97,560 | 270,000 | 6.36 |

TABLE 7

Absolute GPC analysis of Examples 1-2 and Comparative Examples 1-4.

| Sample | $M_{w,Abs}$ (g/mol) | $M_{z,Abs}$ (g/mol) | $M_{w,Abs}/M_{w,GPC}$ |
|---|---|---|---|
| Example 1 | 119,740 | 459,500 | 1.51 |
| Comparative Example 1 | 121,630 | 489,700 | 1.49 |
| Example 2 | 127,270 | 534,300 | 1.56 |
| Comparative Example 2 | 129,030 | 506,300 | 1.51 |
| Comparative Example 3 | 122,220 | 509,900 | 1.51 |
| Comparative Example 4 | 155,070 | 576,800 | 1.59 |

TABLE 8

Intrinsic viscosity and gpcBR from 3D-GPC analysis of Examples 1-2 and Comparative Examples 1-4.

| Sample | $IV_w$ (dl/g) | $IV_z$ (dl/g) | gpcBR |
|---|---|---|---|
| Example 1 | 0.94 | 1.34 | 0.97 |
| Comparative Example 1 | 0.94 | 1.38 | 0.99 |
| Example 2 | 0.96 | 1.37 | 1.03 |
| Comparative Example 2 | 0.94 | 1.41 | 1.09 |
| Comparative Example 3 | 0.94 | 1.38 | 1.01 |
| Comparative Example 4 | 0.99 | 1.49 | 1.26 |

From Table 6 it can be seen that both Examples 1 and 2 show a narrower $M_w/M_n$ ratio by conventional GPC than that of their related Comparative Examples. The comparatively narrower $M_w/M_n$ ratios of both Examples indicates that the Example materials can provide benefits in mechanical properties as well as improved clarity and reduced haze in films as compared to the Comparative Examples. Additionally, both Examples have lower $M_w/M_n$ ratios than Comparative Example 4. The $M_z$ is lower for the Examples in Table 6 in comparison to the Comparative Examples. A lower value for $M_z$, which is related to a lower high molecular weight tails, is also known to be associated with a lower haze value. Higher molecular weight gives higher melt strength and increases the chance of surface roughness in film processing. Surface roughness is believed to negatively impact surface haze. The ratio of the absolute weight average molecular weight, $M_{w,AbS}$, over the conventional weight average molecular weight, $M_{w,GPC}$, as shown in Table 7 indicates that long chain branching exists in all the Examples and four Comparative Examples as the value is greater than one.

A linear polymer would give a gpcBR value expected to be at or near zero. Typically as the level of long chain branching increases the gpcBR index value increases, from the value of zero. As can be seen by the branching information in Table 8, the Examples show slightly less long chain branching than their related Comparative Examples. This would be expected given that high molecular weight material is suppressed early on in the formation of the Examples but not in the Comparative Examples.

The results of DSC analysis using the DSC method for Examples 1 and 2 and Comparative Examples 1-4 are reported in Table 9.

TABLE 9

DSC data for Examples and Comparative Examples 1-4.

| Sample | $T_m$ (° C.) | Heat of Fusion (J/g) | % Cryst. | $T_c$ (° C.) | Density (g/cm³) |
|---|---|---|---|---|---|
| Example 1 | 112.3 | 151.7 | 52.0 | 100.8 | 0.925 |
| Comparative Example 1 | 113.0 | 150.6 | 51.6 | 100.6 | 0.925 |
| Example 2 | 112.0 | 151.2 | 51.8 | 100.1 | 0.924 |
| Comparative Example 2 | 112.2 | 151.6 | 51.9 | 100.4 | 0.925 |
| Comparative Example 3 | 113.1 | 148.6 | 50.9 | 100.7 | 0.925 |
| Comparative Example 4 | 111.5 | 149.2 | 51.1 | 99.5 | 0.923 |

For a given density, the two Example samples generally have a higher heat of fusion as compared to the Comparative Examples.

The results of the sulfur analysis using the Total Sulfur Concentration method for Examples 1 and 2 and Comparative Examples 1 and 2 are reported in Table 10.

TABLE 10

XRF detected sulfur concentration in the ethylene-based polymer samples Examples 1 and 2 and Comparative Examples 1 and 2.

| Sample | XRF measured S concentration ppm (by weight) |
|---|---|
| Example 1 | 143 |
| Comparative Example 1 | 0 |
| Example 2 | 147 |
| Comparative Example 2 | 0 |

The XRF analysis of Examples 1 and 2 show the sulfur concentration value as a result of the sulfur containing high-Cs chain transfer agent compound (in this case, TDM) used in the production of Example 1 and 2. Since no sulfur-containing CTA is used for Comparative Examples 1 and 2, no sulfur is expected in those samples and none is found.

The zero shear viscosity, $\eta_0$, analysis is reported for the two Examples, the analogous Comparative Examples, and several commercially available Comparative Examples in Table 11. In order to better observe the relationship, the factor called "Zg" is defined as the log zero shear viscosity multiplied by the ratio of the conventional weight average molecular weight to the absolute weight average molecular weight as shown in Equation 12:

$$Zg = \text{Log } \eta_0 * (M_{w,GPC}/M_{w,Abs}) \qquad \text{(Eq. 12)}$$

TABLE 11

Density, melt index, weight average molecular weight (GPC and Absolute and their log values), zero shear viscosity and its log value, and the Zg ratio for the Examples and Comparative Examples.

| Sample | Density (g/cc) | $I_2$ (g/10 min) | $M_{w, GPC}$ (g/mol) | $M_{w,Abs}$ (g/mol) | $\eta_o$ 190° C. (Pa·s) | Log ($M_{w,GPC}$ (g/mol)) | Log ($M_{w,Abs}$ (g/mol)) | $Zg = \text{Log}\; \eta_o^* (M_{w,GPC}/M_{w,Abs})$ |
|---|---|---|---|---|---|---|---|---|
| Example 1 | 0.925 | 1.10 | 79,330 | 119,740 | 12,830 | 4.90 | 5.08 | 2.72 |
| Example 2 | 0.924 | 1.08 | 81,820 | 127,270 | 13,630 | 4.91 | 5.10 | 2.65 |
| CE 1 | 0.925 | 1.13 | 81,400 | 121,630 | 14,540 | 4.91 | 5.09 | 2.79 |
| CE 2 | 0.925 | 1.11 | 85,190 | 129,030 | 14,940 | 4.93 | 5.11 | 2.76 |
| CE 3 | 0.925 | 1.04 | 80,960 | 122,220 | 16,150 | 4.91 | 5.09 | 2.79 |
| CE 4 | 0.923 | 0.82 | 97,560 | 155,070 | 24,160 | 4.99 | 5.19 | 2.76 |
| CE 5 | 0.928 | 0.37 | 100,680 | 219,740 | 46,130 | 5.00 | 5.34 | 2.14 |
| CE 6 | 0.923 | 0.78 | 84,440 | 171,110 | 15,590 | 4.93 | 5.23 | 2.07 |
| CE 7 | 0.924 | 0.75 | 75,630 | 124,140 | 15,460 | 4.88 | 5.09 | 2.55 |
| CE 8 | 0.927 | 0.70 | 103,690 | 208,620 | 31,890 | 5.02 | 5.32 | 2.24 |
| CE 9 | 0.933 | 0.63 | 98,450 | 195,770 | 35,550 | 4.99 | 5.29 | 2.29 |
| CE 10 | 0.928 | 0.64 | 92,940 | 166,120 | 34,620 | 4.97 | 5.22 | 2.54 |
| CE 11 | 0.927 | 0.47 | 103,090 | 190,350 | 49,390 | 5.01 | 5.28 | 2.54 |
| CE 12 | 0.920 | 0.15 | 142,110 | 370,280 | 189,086 | 5.15 | 5.57 | 2.03 |
| CE 13 | 0.922 | 2.48 | 85,380 | 184,570 | 6,364 | 4.93 | 5.27 | 1.76 |
| CE 14 | 0.919 | 0.39 | 124,830 | 348,570 | 59,307 | 5.10 | 5.54 | 1.71 |
| CE 15 | 0.922 | 0.80 | 92,150 | 198,980 | 21,766 | 4.96 | 5.30 | 2.01 |
| CE 16 | 0.916 | 28.49 | 76,140 | 184,120 | 469 | 4.88 | 5.27 | 1.10 |
| CE 17 | 0.917 | 6.40 | 101,880 | 289,980 | 2,604 | 5.01 | 5.46 | 1.20 |
| CE 18 | 0.924 | 1.76 | 82,500 | 175,320 | 9,249 | 4.92 | 5.24 | 1.87 |
| CE 19 | 0.926 | 5.61 | 64,600 | 173,180 | 2,878 | 4.81 | 5.24 | 1.29 |
| CE 20 | 0.923 | 0.26 | 128,410 | 294,580 | 107,690 | 5.11 | 5.47 | 2.19 |
| CE 21 | 0.924 | 0.22 | 129,140 | 287,180 | 189,063 | 5.11 | 5.46 | 2.37 |
| CE 22 | 0.924 | 0.81 | 104,040 | 222,980 | 29,021 | 5.02 | 5.35 | 2.08 |
| CE 23 | 0.926 | 5.85 | 71,030 | 153,990 | 2,915 | 4.85 | 5.19 | 1.60 |
| CE 24 | 0.924 | 2.01 | 88,900 | 190,140 | 9,082 | 4.95 | 5.28 | 1.85 |
| CE 25 | 0.929 | 2.50 | 61,490 | 119,000 | 5,813 | 4.79 | 5.08 | 1.95 |
| CE 26 | 0.924 | 0.79 | 98,690 | 160,590 | 25,178 | 4.99 | 5.21 | 2.70 |
| CE 27 | 0.922 | 0.25 | 130,310 | 236,910 | 126,928 | 5.11 | 5.37 | 2.81 |
| CE 28 | 0.924 | 3.41 | 77,990 | 125,750 | 4,479 | 4.89 | 5.10 | 2.26 |
| CE 29 | 0.923 | 2.00 | 80,790 | 176,880 | 8,176 | 4.91 | 5.25 | 1.79 |
| CE 30 | 0.923 | 1.00 | 91,360 | 204,310 | 18,293 | 4.96 | 5.31 | 1.91 |
| CE 31 | 0.925 | 1.82 | 80,440 | 205,500 | 8,825 | 4.91 | 5.31 | 1.54 |
| CE 32 | 0.923 | 0.81 | 93,110 | 236,090 | 24,085 | 4.97 | 5.37 | 1.73 |
| CE 33 | 0.922 | 33.34 | 41,800 | 82,220 | 273 | 4.62 | 4.91 | 1.24 |
| CE 34 | 0.921 | 2.09 | 89,780 | 171,160 | 6,662 | 4.95 | 5.23 | 2.01 |
| CE 35 | 0.922 | 0.67 | 89,040 | 168,820 | 20,012 | 4.95 | 5.23 | 2.27 |
| CE 36 | 0.923 | 4.09 | 113,280 | 249,620 | 4,304 | 5.05 | 5.40 | 1.65 |
| CE 37 | 0.918 | 0.46 | 259,820 | 891,380 | 55,451 | 5.41 | 5.95 | 1.38 |
| CE 38 | 0.912 | 200.00 | 68,130 | 186,700 | 58 | 4.83 | 5.27 | 0.64 |
| CE 39 | 0.924 | 0.70 | 88,120 | 166,500 | 31,453 | 4.95 | 5.22 | 2.38 |
| CE 40 | 0.918 | 7.89 | 145,200 | 419,340 | 1,881 | 5.16 | 5.62 | 1.13 |
| CE 41 | 0.922 | 4.06 | 143,910 | 348,180 | 4,249 | 5.16 | 5.54 | 1.50 |
| CE 42 | 0.921 | 4.63 | 123,360 | 276,410 | 3,639 | 5.09 | 5.44 | 1.59 |
| CE 43 | 0.919 | 6.76 | 129,320 | 313,570 | 2,408 | 5.11 | 5.50 | 1.39 |
| CE 44 | 0.923 | 19.60 | 66,960 | 129,380 | 669 | 4.83 | 5.11 | 1.46 |
| CE 45 | 0.928 | 0.60 | 103,930 | 205,740 | 39,348 | 5.02 | 5.31 | 2.32 |
| CE 46 | 0.931 | 3.20 | 71,630 | 146,670 | 4,607 | 4.86 | 5.17 | 1.79 |
| Linear Standard 1 | 0.953 | 1.04 | 118,530 | 115,000 | 7,830 | 5.07 | 5.06 | 4.01 |

Figure 5:
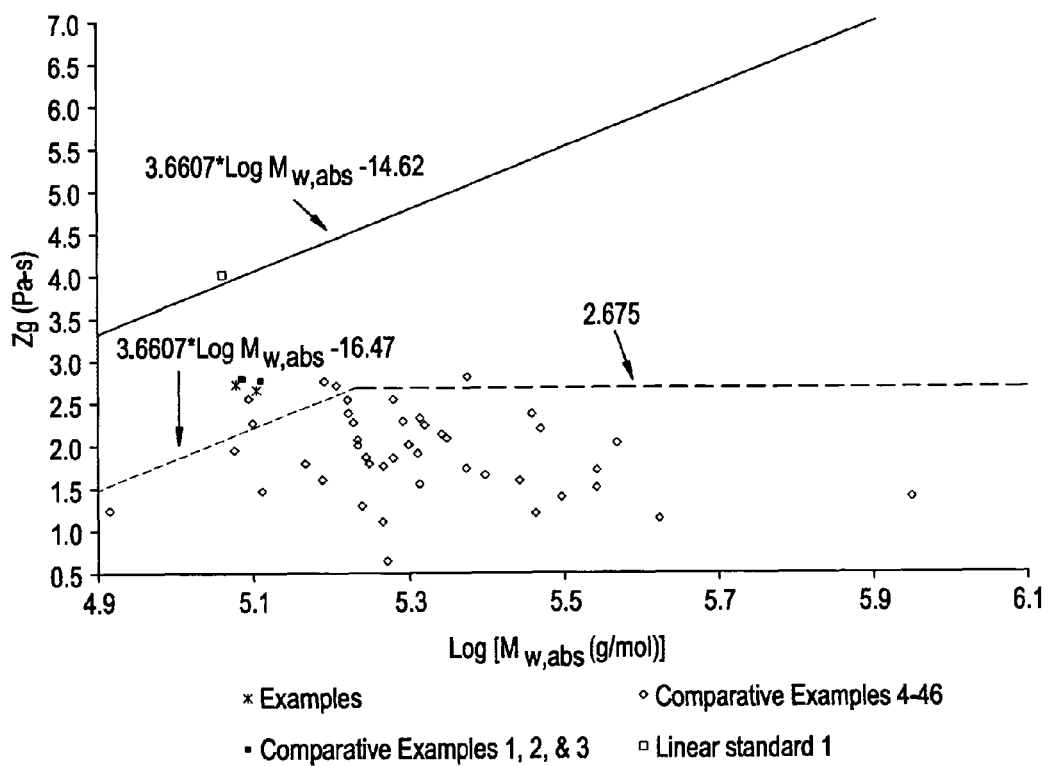
FIG. 5 is a plot of Zg, or Log $\eta_0^*(M_{w, GPC}/M_{w, Abs})$, versus the logarithm of absolute molecular weight, $M_{w, Abs}$, for Examples 1 and 2, Comparative Examples 1-46, and Linear Standard 1.

The relationship between Zg and the absolute molecular weight is shown in FIG. 5. Due to the separation between the Examples and both the analogous and commercially Comparative Examples, lines of demarcation between the groups to emphasize the difference may be established for a given log absolute weight average molecular weight. As shown in FIG. 5, the following numerical relationship exists:

$$(3.6607*\text{Log}\; M_{w,Abs})-16.47 < \text{Log}\; \eta_0^*(M_{w,GPC}/M_{w,Abs}) < (3.6607*\text{Log}\; M_{w,Abs})-14.62. \quad\text{(Eq. 13)}$$

Although not shown in FIG. 5, the following numerical relationship also exists based upon the information in Table 11:

$$(3.6607*\text{Log}\; M_{w,Abs})-16.47 < \text{Log}\; \eta_0^*(M_{w,GPC}/M_{w,Abs}) < (3.6607*\text{Log}\; M_{w,Abs})-14.62 \quad\text{(Eq. 14)}$$

for log $M_{w,Abs}$ values less than 5.23, and $$2.675 < \text{Log}\; \eta_0^*(M_{w,GPC}/M_{w,Abs}) < (3.6607*\text{Log}\; M_{w,Abs})-14.62 \quad\text{(Eq. 15)}$$

for log $M_{w,Abs}$ values equal to or greater than 5.23.

Examples 1 and 2, which are ethylene-based polymers, as shown in FIG. 5, further comprise sulfur.

Figure 6:
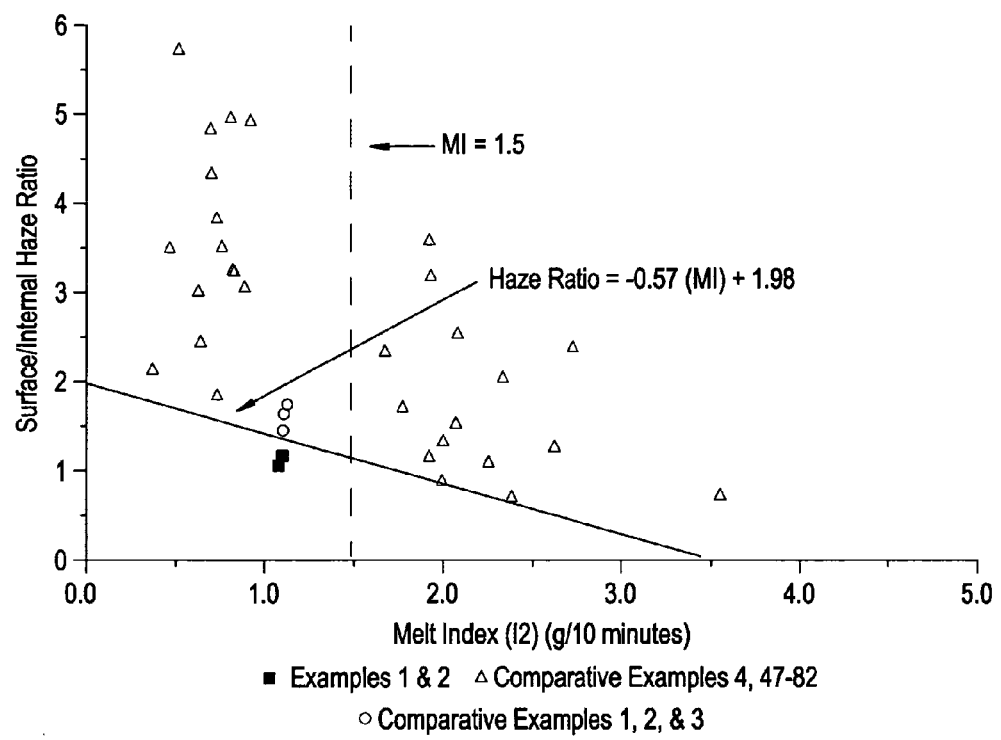
FIG. 6 is a plot of the surface/internal haze ratio versus melt index ($I_2$) for Examples 1 and 2 as well as for Comparative Examples 1-4 and 47-82.

Haze data is reported for films produced from both Examples, the analogous Comparative Examples, and several commercially available Comparative Examples in Table 12. FIG. 6 shows a plot of the data given in Table 12 for surface/internal haze versus melt index ($I_2$).

TABLE 12

Density, melt index, haze, internal haze, surface haze, and surface/internal haze ratio for Examples 1 and 2, Comparative Examples 1-4, and 47-82.

| Sample | Melt Index ($I_2$) (g/10 minutes) | Density (g/cm³) | Haze (%) | Internal Haze (%) | Surface Haze (%) | Surface/Internal Haze Ratio |
|---|---|---|---|---|---|---|
| Example 1 | 1.1 | 0.925 | 6.07 | 2.80 | 3.27 | 1.17 |
| Example 2 | 1.1 | 0.924 | 6.08 | 2.96 | 3.12 | 1.05 |
| Comparative Example 1 | 1.1 | 0.925 | 6.80 | 2.48 | 4.32 | 1.74 |
| Comparative Example 2 | 1.1 | 0.925 | 6.81 | 2.58 | 4.23 | 1.64 |
| Comparative Example 3 | 1.1 | 0.925 | 6.92 | 2.82 | 4.10 | 1.45 |
| Comparative Example 4 | 0.82 | 0.923 | 8.53 | 2.00 | 6.53 | 3.27 |
| Comparative Example 47 | 0.63 | 0.926 | 7.23 | 1.79 | 5.43 | 3.03 |
| Comparative Example 48 | 0.64 | 0.928 | 7.11 | 2.06 | 5.05 | 2.46 |
| Comparative Example 49 | 0.47 | 0.927 | 7.57 | 1.68 | 5.89 | 3.51 |
| Comparative Example 50 | 0.37 | 0.928 | 6.06 | 1.92 | 4.13 | 2.15 |
| Comparative Example 51 | 0.69 | 0.923 | 9.63 | 1.65 | 7.98 | 4.84 |
| Comparative Example 52 | 0.52 | 0.929 | 9.42 | 1.40 | 8.02 | 5.74 |
| Comparative Example 53 | 1.7 | 0.924 | 6.40 | 1.91 | 4.49 | 2.35 |
| Comparative Example 54 | 0.89 | 0.924 | 7.38 | 1.81 | 5.57 | 3.07 |
| Comparative Example 55 | 2.1 | 0.918 | 16.94 | 1.51 | 15.43 | 10.22 |
| Comparative Example 56 | 2.0 | 0.920 | 5.39 | 2.84 | 2.55 | 0.90 |
| Comparative Example 57 | 0.73 | 0.920 | 6.24 | 2.18 | 4.06 | 1.86 |
| Comparative Example 58 | 0.23 | 0.921 | 9.74 | 0.51 | 9.23 | 18.10 |
| Comparative Example 59 | 0.70 | 0.922 | 5.56 | 1.04 | 4.52 | 4.35 |
| Comparative Example 60 | 2.1 | 0.922 | 4.63 | 1.82 | 2.81 | 1.54 |
| Comparative Example 61 | 0.26 | 0.919 | 12.72 | 0.53 | 12.19 | 23.00 |
| Comparative Example 62 | 2.4 | 0.927 | 4.98 | 2.90 | 2.08 | 0.72 |
| Comparative Example 63 | 1.8 | 0.925 | 5.99 | 2.20 | 3.79 | 1.72 |
| Comparative Example 64 | 0.76 | 0.925 | 11.16 | 1.55 | 9.61 | 6.20 |
| Comparative Example 65 | 1.9 | 0.920 | 6.17 | 1.47 | 4.70 | 3.20 |
| Comparative Example 66 | 0.83 | 0.921 | 4.80 | 1.13 | 3.67 | 3.25 |
| Comparative Example 67 | 0.76 | 0.924 | 5.97 | 1.32 | 4.65 | 3.52 |
| Comparative Example 68 | 2.0 | 0.925 | 5.20 | 2.22 | 2.98 | 1.34 |
| Comparative Example 69 | 2.6 | 0.925 | 7.70 | 3.38 | 4.32 | 1.28 |
| Comparative Example 70 | 0.30 | 0.917 | 12.09 | 0.36 | 11.73 | 32.58 |
| Comparative Example 71 | 0.26 | 0.922 | 5.65 | 0.74 | 4.91 | 6.64 |
| Comparative Example 72 | 1.9 | 0.919 | 5.38 | 1.17 | 4.21 | 3.60 |
| Comparative Example 73 | 2.3 | 0.920 | 4.92 | 1.61 | 3.31 | 2.06 |
| Comparative Example 74 | 0.81 | 0.922 | 6.69 | 1.12 | 5.57 | 4.97 |
| Comparative Example 75 | 0.73 | 0.924 | 6.88 | 1.42 | 5.46 | 3.85 |
| Comparative Example 76 | 1.9 | 0.924 | 4.49 | 2.07 | 2.42 | 1.17 |
| Comparative Example 77 | 2.1 | 0.921 | 5.36 | 1.51 | 3.85 | 2.55 |
| Comparative Example 78 | 2.3 | 0.931 | 6.77 | 3.21 | 3.56 | 1.11 |
| Comparative Example 79 | 3.6 | 0.931 | 7.38 | 4.24 | 3.14 | 0.74 |
| Comparative Example 80 | 2.7 | 0.923 | 6.83 | 2.01 | 4.82 | 2.40 |
| Comparative Example 81 | 2.0 | 0.922 | 7.04 | 0.42 | 6.62 | 15.76 |
| Comparative Example 82 | 0.92 | 0.924 | 7.72 | 1.30 | 6.42 | 4.94 |

As defined in the Surface and Internal Haze method, described infra in the Testing Methods section, surface haze is the difference between overall haze and internal haze. As can be seen in Table 12, the Examples have a relatively lower surface/internal haze value compared to the analogous Comparative Examples. These results show that by narrowing the $M_w/M_n$, of the two Examples that the surface haze is reduced as compared to the Comparative Examples with a similar melt index ($I_2$). It is believed that the surface roughness of the films made from the Examples are reduced versus the Comparative Examples, thereby improving the surface haze value. The surface/internal haze ratio shows the effect of changes in surface haze on film properties to an extent normalizing for density differences among the polymer products. The total haze of the Examples is reduced versus the Comparative Examples by reducing the surface haze.

Using data from Table 12, a comparison plot is shown in FIG. 6 between the surface haze, S, the internal haze, I, both in units of % and both determined by using the Surface and Internal Haze method, and the melt index ($I_2$). Due to the separation between the Examples and both the analogous and commercially Comparative Examples, a line of demarcation between the two groups to emphasize the difference may be established for a given melt index ($I_2$) range. As shown in FIG. 6, the following numerical relationship exists:

$$S/I \leq (-0.057 * I_2) + 1.98 \qquad (Eq.\ 16)$$

Although not shown in FIG. 6, the following numerical relationship also exists based upon the data in Table 12:

$$S/I \leq (-0.057 * I_2) + 1.85 \qquad (Eq.\ 17)$$

For the ethylene-based polymers described by both of these relationships, the melt index ($I_2$) range may be from about 0.1 to about 1.5. For these ethylene-based polymers, the polymers may further comprise sulfur.

The GPC-LS Characterization value, Y, is reported for the Examples, the analogous Comparative Examples, and several commercially available Comparative Examples in Table 13. FIGS. 2 and 3, previously disclosed, show concentration-normalized LS chromatogram curves and GPC-LS Characterization analysis for Example 1 and Comparative Example 4, respectively.

TABLE 13

GPC-LS Characterization for the Examples and both analogous and commercially Comparative Examples (CE).

| Sample | Ratio of A/B | x | Y | MI (I2) (g/10 minutes) | Density (g/cm3) |
|---|---|---|---|---|---|
| Example 1 | 0.30 | −10.9 | 3.3 | 1.1 | 0.925 |
| Example 2 | 0.23 | −10.9 | 2.5 | 1.1 | 0.924 |
| Comparative Example 1 | 0.20 | −10.5 | 2.1 | 1.1 | 0.925 |
| Comparative Example 2 | 0.15 | −11.3 | 1.7 | 1.1 | 0.925 |
| Comparative Example 3 | 0.20 | −9.06 | 1.8 | 1.0 | 0.925 |
| Comparative Example 4 | −0.03 | −8.66 | −0.3 | 0.82 | 0.923 |
| Comparative Example 83 | 0.02 | 0.57 | 0.0 | 0.15 | 0.920 |
| Comparative Example 84 | 0.26 | 0.19 | −0.1 | 2.5 | 0.921 |
| Comparative Example 85 | 0.07 | 0.63 | 0.0 | 0.39 | 0.919 |
| Comparative Example 86 | 0.19 | −0.14 | 0.0 | 0.80 | 0.923 |
| Comparative Example 87 | 0.23 | 0.99 | −0.2 | 29 | 0.916 |
| Comparative Example 88 | 0.18 | 0.96 | −0.2 | 6.4 | 0.917 |
| Comparative Example 89 | 0.35 | 0.41 | −0.1 | 1.8 | 0.925 |
| Comparative Example 90 | 0.34 | 0.94 | −0.3 | 5.6 | 0.927 |
| Comparative Example 91 | 0.06 | 0.38 | 0.0 | 0.26 | 0.923 |
| Comparative Example 92 | −0.05 | 0.21 | 0.0 | 0.22 | 0.924 |
| Comparative Example 93 | 0.06 | −0.12 | 0.0 | 0.81 | 0.925 |
| Comparative Example 94 | 0.25 | 0.52 | −0.1 | 5.9 | 0.927 |
| Comparative Example 95 | 0.17 | 0.09 | 0.0 | 2.0 | 0.925 |
| Comparative Example 96 | −0.13 | 0.89 | 0.1 | 4.1 | 0.924 |
| Comparative Example 97 | 0.34 | 1.20 | −0.4 | 33 | 0.922 |
| Comparative Example 98 | −0.11 | 1.22 | 0.1 | 4.1 | 0.921 |
| Comparative Example 99 | 0.13 | 1.51 | −0.2 | 0.46 | 0.917 |
| Comparative Example 100 | −0.05 | −0.99 | 0.0 | 2.1 | 0.920 |
| Comparative Example 101 | −0.26 | 0.18 | 0.0 | 200 | 0.912 |
| Comparative Example 102 | −0.08 | 1.30 | 0.1 | 8.2 | 0.917 |
| Comparative Example 103 | 0.04 | −1.18 | 0.1 | 0.67 | 0.921 |
| Comparative Example 104 | −0.06 | −6.45 | −0.4 | 0.79 | 0.923 |
| Comparative Example 105 | −0.24 | −2.06 | −0.5 | 0.25 | 0.921 |
| Comparative Example 106 | 0.09 | −6.56 | 0.6 | 3.4 | 0.924 |
| Comparative Example 107 | −0.16 | 0.81 | 0.1 | 4.6 | 0.920 |
| Comparative Example 108 | 0.37 | 0.92 | −0.3 | 1.8 | 0.925 |
| Comparative Example 109 | 0.28 | 0.68 | −0.2 | 0.81 | 0.923 |
| Comparative Example 110 | −0.13 | 1.06 | 0.1 | 6.8 | 0.919 |
| Comparative Example 111 | 0.16 | −1.51 | 0.2 | 1.9 | 0.924 |
| Comparative Example 112 | 0.27 | 0.44 | −0.1 | 1.9 | 0.920 |
| Comparative Example 113 | 0.31 | −0.98 | 0.3 | 2.3 | 0.931 |
| Comparative Example 114 | 0.21 | 0.35 | −0.1 | 0.64 | 0.923 |
| Comparative Example 115 | 0.37 | −0.15 | 0.1 | 1.8 | 0.925 |
| Comparative Example 116 | 0.36 | 0.16 | −0.1 | 0.83 | 0.921 |
| Comparative Example 117 | 0.10 | 0.08 | 0.0 | 0.23 | 0.921 |
| Comparative Example 118 | 0.44 | 1.13 | −0.5 | 2.0 | 0.925 |
| Comparative Example 119 | 0.13 | 0.18 | 0.0 | 0.21 | 0.922 |
| Comparative Example 120 | 0.38 | 0.89 | −0.3 | 2.7 | 0.923 |
| Comparative Example 121 | 0.08 | 0.19 | 0.0 | 0.30 | 0.917 |
| Comparative Example 122 | −0.13 | 0.33 | 0.0 | 0.16 | 0.921 |
| Comparative Example 123 | 0.44 | 1.15 | −0.5 | 2.6 | 0.925 |
| Comparative Example 124 | −0.01 | −1.05 | 0.0 | 0.81 | 0.922 |
| Comparative Example 125 | 0.32 | 0.77 | −0.2 | 2.0 | 0.922 |
| Comparative Example 126 | 0.00 | 0.22 | 0.0 | 2.0 | 0.921 |
| Comparative Example 127 | 0.05 | 0.49 | 0.0 | 0.26 | 0.919 |
| Comparative Example 128 | 0.32 | 0.77 | −0.2 | 0.26 | 0.922 |
| Comparative Example 129 | 0.26 | −0.35 | 0.1 | 0.91 | 0.924 |
| Comparative Example 130 | 0.17 | −0.25 | 0.0 | 0.70 | 0.922 |
| Comparative Example 131 | 0.32 | 0.44 | −0.1 | 2.3 | 0.923 |
| Comparative Example 132 | 0.24 | 0.27 | −0.1 | 0.92 | 0.924 |
| Comparative Example 133 | 0.42 | 1.03 | −0.4 | 0.76 | 0.924 |
| Comparative Example 134 | −0.01 | 1.22 | 0.0 | 2.4 | 0.918 |
| Comparative Example 135 | 0.45 | −0.79 | 0.4 | 3.6 | 0.931 |
| Comparative Example 136 | 0.25 | 0.10 | 0.0 | 2.2 | 0.927 |
| Comparative Example 137 | 0.37 | 0.81 | −0.3 | 2.7 | 0.923 |
| Comparative Example 138 | 0.07 | −1.18 | 0.1 | 0.76 | 0.925 |
| Comparative Example 139 | 0.24 | 0.03 | 0.0 | 2.1 | 0.922 |
| Comparative Example 140 | 0.14 | 0.03 | 0.0 | 1.9 | 0.919 |
| Comparative Example 141 | 0.53 | 0.31 | −0.2 | 2.4 | 0.927 |
| Comparative Example 142 | 0.37 | 0.85 | −0.3 | 2.7 | 0.923 |
| Comparative Example 143 | 0.30 | 0.49 | −0.1 | 1.9 | 0.925 |
| Comparative Example 144 | 0.08 | −0.86 | 0.1 | 2.1 | 0.921 |
| Comparative Example 145 | 0.02 | 0.53 | 0.0 | 0.26 | 0.918 |
| Comparative Example 146 | 0.04 | −1.69 | 0.1 | 0.73 | 0.924 |
| Comparative Example 147 | 0.13 | 1.50 | −0.2 | 0.43 | 0.919 |
| Comparative Example 148 | 0.12 | 1.49 | −0.2 | 0.48 | 0.918 |
| Comparative Example 149 | −0.01 | −0.60 | 0.0 | 0.71 | 0.924 |
| Comparative Example 150 | 0.04 | 1.32 | 0.0 | 2.2 | 0.918 |
| Comparative Example 151 | 0.01 | −1.36 | 0.0 | 2.4 | 0.920 |

TABLE 13-continued

GPC-LS Characterization for the Examples and both analogous and commercially Comparative Examples (CE).

| Sample | Ratio of A/B | x | Y | MI (I2) (g/10 minutes) | Density (g/cm3) |
|---|---|---|---|---|---|
| Comparative Example 152 | 0.26 | 0.77 | −0.2 | 2.0 | 0.922 |
| Comparative Example 153 | −0.10 | 1.20 | 0.1 | 7.9 | 0.919 |
| Comparative Example 154 | 0.27 | 0.89 | −0.2 | 6.6 | 0.927 |
| Comparative Example 155 | 0.34 | 0.65 | −0.2 | 0.37 | 0.928 |
| Comparative Example 156 | −0.08 | 0.21 | 0.0 | 0.70 | 0.927 |
| Comparative Example 157 | −0.08 | 0.07 | 0.0 | 0.63 | 0.933 |
| Comparative Example 158 | −0.05 | −0.31 | 0.0 | 0.64 | 0.928 |
| Comparative Example 159 | −0.09 | −0.25 | 0.0 | 0.47 | 0.927 |
| Comparative Example 160 | 0.17 | 0.32 | −0.1 | 0.92 | 0.921 |

As can be seen from the data presented in Table 13, none of the analogous or commercially Comparative Examples have a GPC-LS Characterization value that is greater than 2.1, whereas both Examples have a value greater than 2.1. The GPC-LS Characterization equation captures the effect of suppressing the molecular weight of the chains formed early in the reactor with a high-Cs CTA, thereby narrowing the molecular weight distribution while still permitting some long chain branching, which is indicative of low density polyethylene, to occur in the later part of the process when a low-Cs CTA predominates. This results in a product with a lower molecular weight in the "log MW value of 6" molecular weight range (as can be seen in FIG. 2) and lower gpcBR values (as indicated in Table 8).

An extrusion multi-pass test is performed on Example 1 and Comparative Example 3 to determine relative atmospheric stability of the inventive polymer over the comparative polymer. A 5-pass test is used and is conducted per the Extrusion Multi-pass method, described infra in the Testing Methods section. Tables 14 and 15 show, respectively, the conditions of each pass for Example 1 and Comparative Example 3. FIG. 6 shows the melt index ($I_2$) of Example 1 and Comparative Example 3 after each pass. Melt index, $I_2$, is tested on samples taken before the campaign as well as on samples taken between each run.

TABLE 14

Feed and processing conditions for Example 1 during 5-pass Extrusion Multi-pass test.

| Pass | Feed Rate (lbs/hr) | Melt Temp. (° C.) | Torque (m - g) | Die Press. (psi) |
|---|---|---|---|---|
| 1 | 5.0 | 222 | 2700 | 520 |
| 2 | 4.5 | 223 | 2100 | 485 |
| 3 | 4.2 | 222 | 2000 | 475 |
| 4 | 4.3 | 222 | 1900 | 460 |
| 5 | 4.4 | 222 | 1900 | 465 |

TABLE 15

Feed and processing conditions for Comparative Example 3 during 5-pass Extrusion Multi-pass test.

| Pass | Feed Rate (lbs/hr) | Melt Temp. (° C.) | Torque (m - g) | Die Press. (psi) |
|---|---|---|---|---|
| 1 | 4.55 | 224 | 2700 | 490 |
| 2 | 3.95 | 226 | 2200 | 460 |
| 3 | 4.6 | 221 | 2300 | 500 |
| 4 | 4.6 | 223 | 2300 | 500 |
| 5 | 4.7 | 222 | 2300 | 500 |

Figure 7:
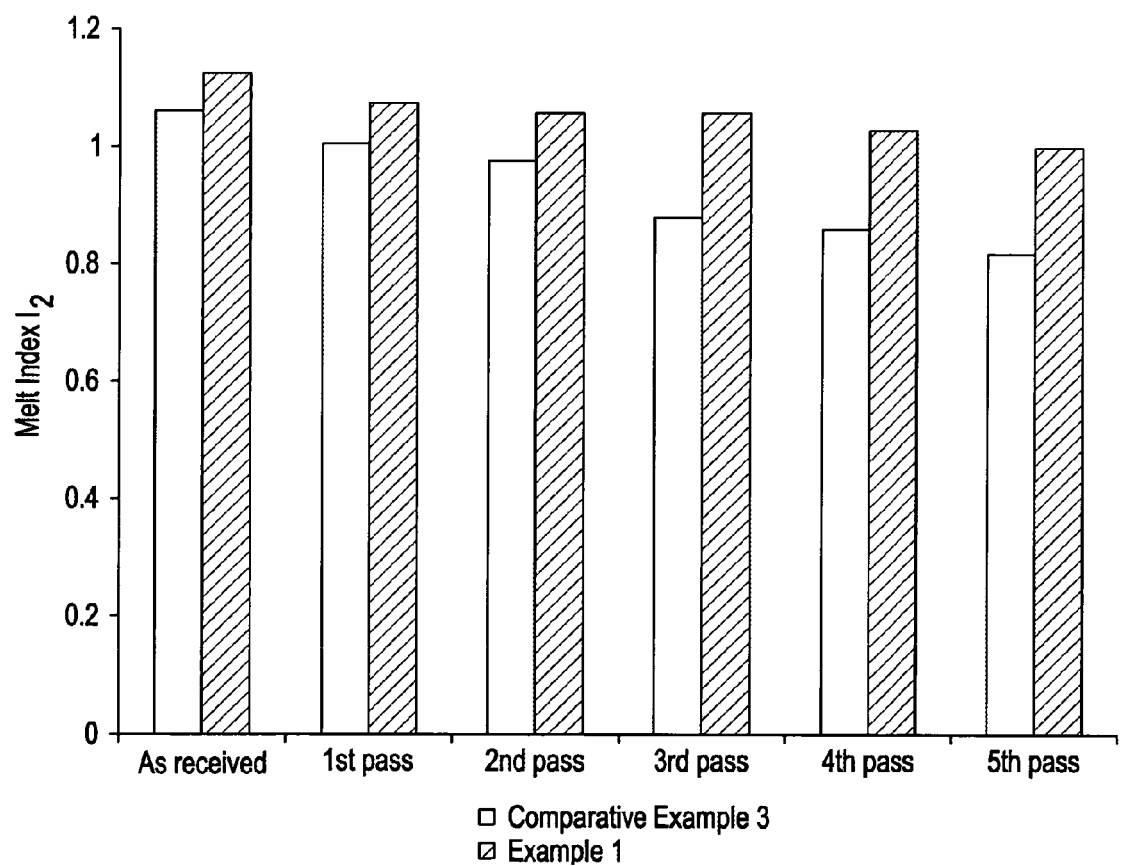
FIG. 7 is a chart of melt index ($I_2$) versus extrusion pass number versus for Example 1 and Comparative Example 3 under atmospheric conditions.

As can be seen in FIG. 7, Comparative Example 3 shows significantly more oxidative degradation than Example 1 for the near-analogous conditions given in Tables 14 and 15. Comparative Example 3 has a 23.0% reduction in melt index (1.061 g/10 min. "as received" and 0.817 g/10 min. after the 5th pass) versus an 11.3% reduction in melt index (1.125 g/10 min "as received" and 0.998 g/10 min after the 5th pass) for Example 1. These data are also summarized in Table 15 for the melt index and also for the $M_{w,GPC}$ in which a 7.65% change is seen for Comparative Example 3 and only a 1.18% change for Example 1.

TABLE 16

Multiple pass extrusion data on Comparative Example 3 (CE 3) and Example 1 for 5 passes showing the melt index $I_2$ change and the weight average molecular weight change $M_{w,GPC}$.

| Sample | Pass | $I_2$ (g/10 min) | $I_2$ % Change from As Received | $M_{w, GPC}$ (g/mol) | $M_{w, GPC}$ % Change from As Received |
|---|---|---|---|---|---|
| CE 3 | As Received | 1.06 | | 86,510 | |
| CE 3 | 1st Pass | 1.01 | −5.28 | 86,650 | 0.16 |
| CE 3 | 2nd Pass | 0.98 | −8.04 | 87,960 | 1.68 |
| CE 3 | 3rd Pass | 0.88 | −17.18 | 89,320 | 3.25 |
| CE 3 | 4th Pass | 0.86 | −19.01 | 92,070 | 6.43 |
| CE 3 | 5th Pass | 0.82 | −23.03 | 93,130 | 7.65 |
| Example 1 | As Received | 1.13 | | 84,110 | |
| Example 1 | 1st Pass | 1.07 | −4.53 | 82,900 | −1.44 |
| Example 1 | 2nd Pass | 1.06 | −5.96 | 84,580 | 0.56 |
| Example 1 | 3rd Pass | 1.06 | −5.96 | 83,690 | −0.50 |
| Example 1 | 4th Pass | 1.03 | −8.62 | 84,530 | 0.50 |
| Example 1 | 5th Pass | 1.00 | −11.29 | 85,100 | 1.18 |

Figure 8:
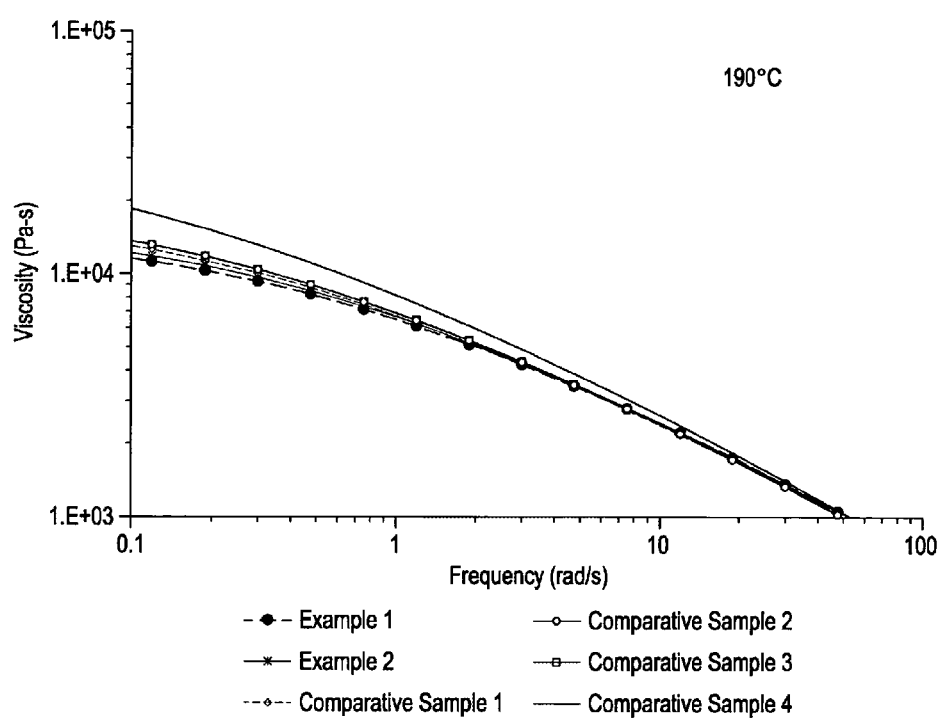
FIG. 8 is a plot of viscosity versus frequency as determined by Dynamic Mechanical Spectroscopy for Examples 1 and 2 and Comparative Examples 1-4.
Figure 9:
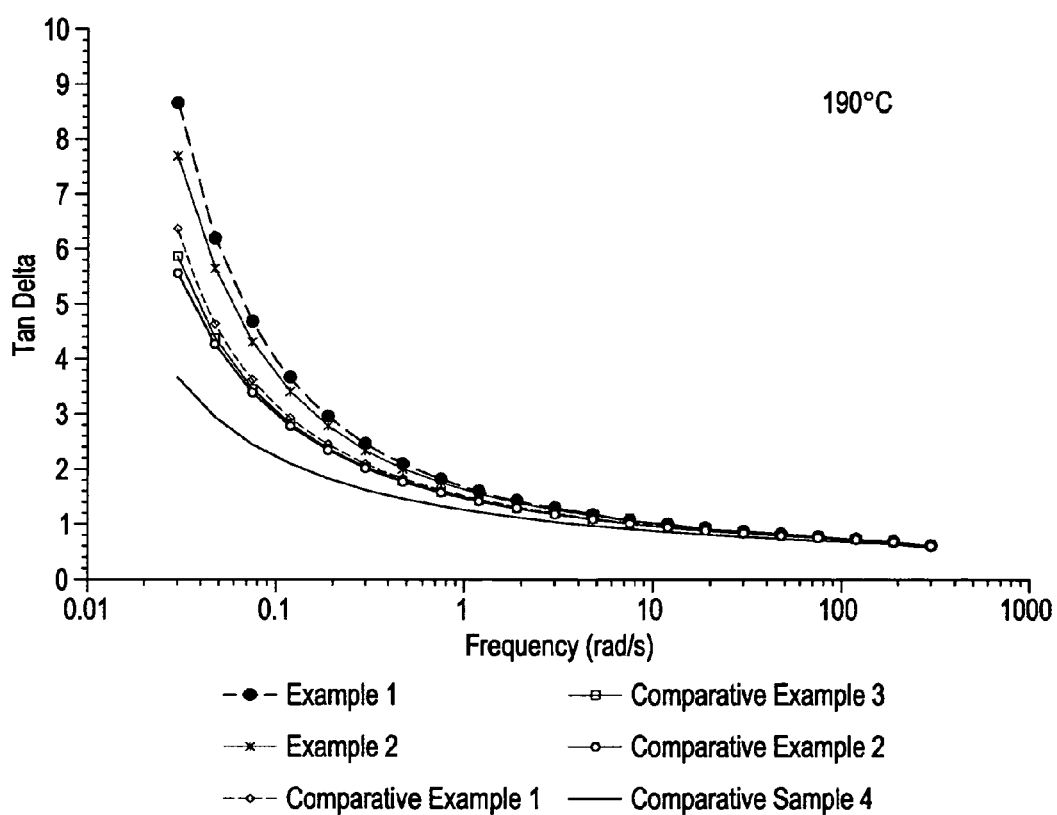
FIG. 9 is a plot of tan delta versus frequency as determined by Dynamic Mechanical Spectroscopy for Examples 1 and 2 and Comparative Examples 1-4.
Figure 10:
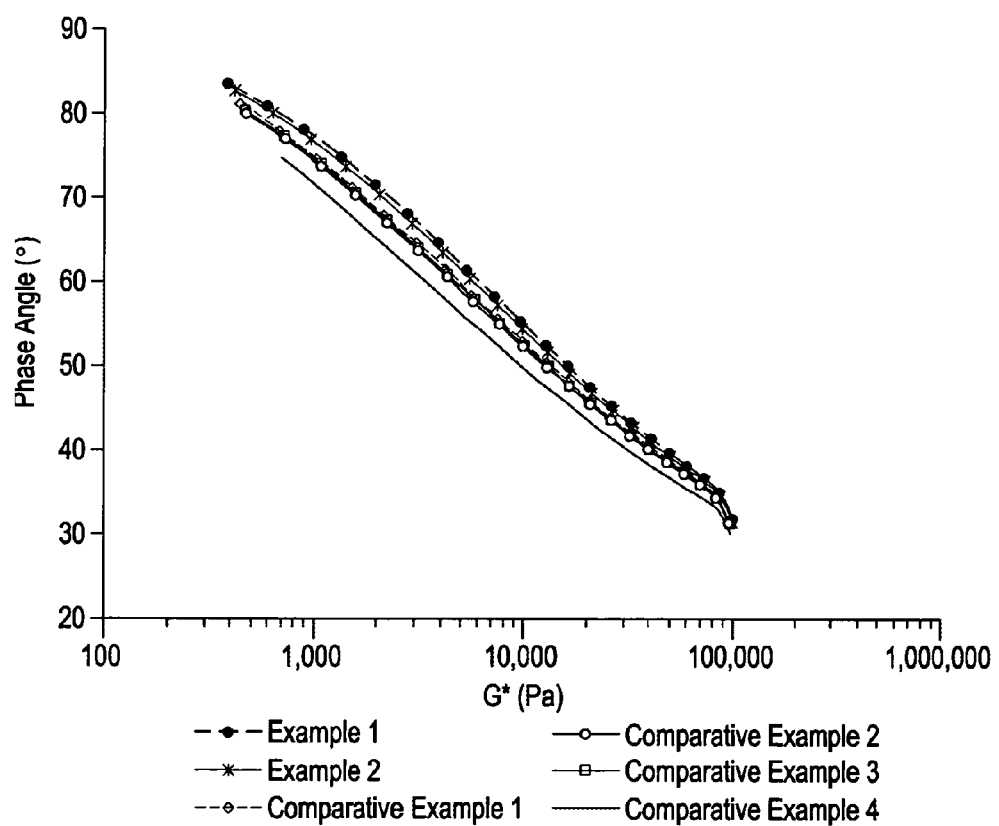
FIG. 10 is a plot of phase angle versus G* as determined by Dynamic Mechanical Spectroscopy for Examples 1 and 2 and Comparative Examples 1-4.

Dynamic Mechanical Spectroscopy data were gathered and conducted using the Dynamic Mechanical Spectroscopy method described infra in the Testing Methods section. FIGS. 8, 9, and 10 show, respectively, the viscosity overlay, the tan delta overlay, and van Gurp-Palmen (Trinkle, S. and C. Friedrich, Rheologica Acta, 2001. 40(4): p. 322-328) analysis for Examples 1 and 2 and Comparative Examples 1-4. These data are summarized in Tables 17-19.

TABLE 17

Dynamic mechanical complex viscosity data at 190° C. of Example 1-2 and Comparative Examples (CE) 1-4.

| Frequency | Viscosity (Pa-s) at 190° C. | | | | | |
|---|---|---|---|---|---|---|
| (rad/s) | Example 1 | CE 1 | Example 2 | CE 2 | CE 3 | CE 4 |
| 0.03 | 12,899 | 14,679 | 13,804 | 15,803 | 15,620 | 23,182 |
| 0.04755 | 12,533 | 14,375 | 13,359 | 15,339 | 15,172 | 21,795 |
| 0.07536 | 11,967 | 13,616 | 12,706 | 14,386 | 14,300 | 19,866 |
| 0.11943 | 11,224 | 12,577 | 11,830 | 13,172 | 13,156 | 17,635 |
| 0.18929 | 10,323 | 11,358 | 10,808 | 11,837 | 11,824 | 15,364 |
| 0.3 | 9,308 | 10,061 | 9,677 | 10,414 | 10,435 | 13,136 |

TABLE 17-continued

Dynamic mechanical complex viscosity data at 190° C. of Example 1-2 and Comparative Examples (CE) 1-4.

| Frequency (rad/s) | Viscosity (Pa-s) at 190° C. | | | | | |
|---|---|---|---|---|---|---|
| | Example 1 | CE 1 | Example 2 | CE 2 | CE 3 | CE 4 |
| 0.47547 | 8,227 | 8,744 | 8,503 | 9,018 | 9,040 | 11,082 |
| 0.75357 | 7,145 | 7,471 | 7,349 | 7,667 | 7,700 | 9,203 |
| 1.19432 | 6,102 | 6,290 | 6,243 | 6,432 | 6,463 | 7,547 |
| 1.89287 | 5,124 | 5,216 | 5,220 | 5,316 | 5,347 | 6,115 |
| 3 | 4,240 | 4,270 | 4,302 | 4,337 | 4,366 | 4,899 |
| 4.75468 | 3,460 | 3,451 | 3,499 | 3,496 | 3,522 | 3,885 |
| 7.53566 | 2,789 | 2,759 | 2,811 | 2,788 | 2,810 | 3,052 |
| 11.9432 | 2,221 | 2,182 | 2,232 | 2,200 | 2,219 | 2,377 |
| 18.9287 | 1,749 | 1,709 | 1,754 | 1,719 | 1,735 | 1,835 |
| 30 | 1,365 | 1,327 | 1,365 | 1,332 | 1,345 | 1,407 |
| 47.5468 | 1,054 | 1,021 | 1,053 | 1,024 | 1,034 | 1,070 |
| 75.3566 | 808 | 780 | 805 | 781 | 789 | 809 |
| 119.432 | 613 | 590 | 610 | 590 | 596 | 607 |
| 189.287 | 460 | 442 | 457 | 442 | 446 | 450 |
| 300 | 335 | 321 | 332 | 320 | 324 | 325 |

TABLE 18

Tan Delta at 190° C. of Example 1-2 and Comparative Examples (CE) 1-4.

| Frequency (rad/s) | Tan Delta at 190° C. | | | | | |
|---|---|---|---|---|---|---|
| | Example 1 | CE 1 | Example 2 | CE 2 | CE 3 | CE 4 |
| 0.03 | 8.66 | 6.37 | 7.70 | 5.56 | 5.87 | 3.66 |
| 0.04755 | 6.20 | 4.64 | 5.65 | 4.27 | 4.38 | 2.94 |
| 0.07536 | 4.69 | 3.63 | 4.31 | 3.39 | 3.46 | 2.45 |
| 0.11943 | 3.67 | 2.93 | 3.41 | 2.78 | 2.82 | 2.10 |
| 0.18929 | 2.96 | 2.45 | 2.79 | 2.34 | 2.37 | 1.83 |
| 0.3 | 2.46 | 2.10 | 2.34 | 2.02 | 2.04 | 1.63 |
| 0.47547 | 2.10 | 1.83 | 2.00 | 1.77 | 1.79 | 1.46 |
| 0.75357 | 1.82 | 1.62 | 1.75 | 1.57 | 1.59 | 1.33 |
| 1.19432 | 1.61 | 1.45 | 1.55 | 1.42 | 1.43 | 1.22 |
| 1.89287 | 1.43 | 1.32 | 1.39 | 1.29 | 1.29 | 1.12 |
| 3 | 1.30 | 1.20 | 1.26 | 1.18 | 1.19 | 1.05 |
| 4.75468 | 1.18 | 1.11 | 1.16 | 1.09 | 1.09 | 0.98 |
| 7.53566 | 1.09 | 1.03 | 1.06 | 1.01 | 1.02 | 0.92 |
| 11.9432 | 1.01 | 0.96 | 0.99 | 0.95 | 0.95 | 0.86 |
| 18.9287 | 0.94 | 0.90 | 0.92 | 0.89 | 0.89 | 0.82 |
| 30 | 0.88 | 0.85 | 0.86 | 0.84 | 0.84 | 0.78 |
| 47.5468 | 0.83 | 0.80 | 0.81 | 0.79 | 0.80 | 0.74 |
| 75.3566 | 0.78 | 0.76 | 0.77 | 0.76 | 0.76 | 0.71 |
| 119.432 | 0.74 | 0.73 | 0.73 | 0.72 | 0.72 | 0.68 |
| 189.287 | 0.70 | 0.68 | 0.69 | 0.68 | 0.68 | 0.64 |
| 300 | 0.62 | 0.61 | 0.61 | 0.61 | 0.61 | 0.58 |

TABLE 19

Complex modulus (G*) in Pa and Phase Angle at 190° C. of Example (Ex.) 1-2 and Comparative Examples (CE) 1-4.

| Ex. 1 G* (Pa) | Ex. 1 Phase Angle | CE 1 G* (Pa) | CE 1 Phase Angle | Ex. 2 G* (Pa) | Ex. 2 Phase Angle | CE 2 G* (Pa) | CE 2 Phase Angle | CE 3 G* (Pa) | CE 3 Phase Angle | CE 4 G* (Pa) | CE 4 Phase Angle |
|---|---|---|---|---|---|---|---|---|---|---|---|
| 387 | 83.41 | 440 | 81.08 | 414 | 82.60 | 474 | 79.80 | 469 | 80.33 | 695 | 74.74 |
| 596 | 80.83 | 683 | 77.83 | 635 | 79.96 | 729 | 76.81 | 721 | 77.14 | 1,036 | 71.20 |
| 902 | 77.96 | 1,026 | 74.58 | 958 | 76.94 | 1,084 | 73.54 | 1,078 | 73.87 | 1,497 | 67.78 |
| 1,341 | 74.75 | 1,502 | 71.16 | 1,413 | 73.67 | 1,573 | 70.20 | 1,571 | 70.49 | 2,106 | 64.51 |
| 1,954 | 71.36 | 2,150 | 67.83 | 2,046 | 70.26 | 2,241 | 66.87 | 2,238 | 67.15 | 2,908 | 61.37 |
| 2,792 | 67.91 | 3,018 | 64.51 | 2,903 | 66.85 | 3,124 | 63.63 | 3,131 | 63.88 | 3,941 | 58.43 |
| 3,912 | 64.54 | 4,158 | 61.37 | 4,043 | 63.49 | 4,288 | 60.52 | 4,298 | 60.76 | 5,269 | 55.67 |
| 5,384 | 61.27 | 5,630 | 58.32 | 5,538 | 60.31 | 5,777 | 57.57 | 5,803 | 57.75 | 6,935 | 53.07 |
| 7,288 | 58.12 | 7,512 | 55.49 | 7,456 | 57.24 | 7,682 | 54.78 | 7,719 | 54.96 | 9,014 | 50.64 |
| 9,698 | 55.13 | 9,874 | 52.78 | 9,880 | 54.31 | 10,062 | 52.13 | 10,120 | 52.29 | 11,574 | 48.34 |
| 12,721 | 52.38 | 12,809 | 50.31 | 12,907 | 51.64 | 13,010 | 49.73 | 13,097 | 49.86 | 14,698 | 46.26 |
| 16,452 | 49.78 | 16,410 | 47.98 | 16,635 | 49.12 | 16,624 | 47.45 | 16,746 | 47.57 | 18,473 | 44.30 |
| 21,014 | 47.38 | 20,791 | 45.81 | 21,181 | 46.78 | 21,008 | 45.35 | 21,175 | 45.45 | 23,002 | 42.48 |
| 26,525 | 45.15 | 26,064 | 43.81 | 26,662 | 44.61 | 26,276 | 43.39 | 26,501 | 43.48 | 28,387 | 40.79 |
| 33,107 | 43.12 | 32,345 | 41.97 | 33,194 | 42.63 | 32,542 | 41.60 | 32,836 | 41.68 | 34,742 | 39.25 |
| 40,937 | 41.24 | 39,804 | 40.29 | 40,955 | 40.81 | 39,973 | 39.96 | 40,353 | 40.02 | 42,201 | 37.82 |
| 50,133 | 39.54 | 48,543 | 38.75 | 50,045 | 39.16 | 48,678 | 38.46 | 49,156 | 38.51 | 50,883 | 36.52 |
| 60,897 | 37.98 | 58,765 | 37.33 | 60,674 | 37.64 | 58,846 | 37.07 | 59,442 | 37.12 | 60,962 | 35.33 |
| 73,197 | 36.51 | 70,484 | 36.00 | 72,841 | 36.21 | 70,491 | 35.77 | 71,226 | 35.81 | 72,441 | 34.19 |
| 87,055 | 34.80 | 83,655 | 34.37 | 86,508 | 34.53 | 83,573 | 34.17 | 84,459 | 34.20 | 85,253 | 32.78 |
| 100,374 | 31.70 | 96,297 | 31.42 | 99,619 | 31.46 | 96,132 | 31.24 | 97,151 | 31.26 | 97,410 | 29.96 |

As shown in FIG. 8, the inventive samples show less shear thinning than do the comparative samples. This is a reflection of the narrower molecular weight distribution. It is expected that these materials may run with slightly higher backpressures when producing film than the Comparative Examples. On the other had, as a result of the narrower molecular weight distribution, some film properties may be expected to improve. In FIG. 9, the inventive samples show higher tan δ values than do the comparative samples over the entire measured frequency range. The higher tan delta values reflect a less elastic material again resulting from the narrower molecular weight distribution. Highly elasticity may be expected to contribute to pressure drop during extrusion, so this may aid in the processing of these material. In FIG. 10 the G* versus Phase angle plot, the inventive samples also show higher phase angle at the same G* value than do the comparative samples. These results indicate that the inventive samples have shorter relaxation times and are less elastic than the comparative samples, which could be caused by their narrower MWD. The shorter relaxation times may be advantageous in film blowing, allowing the material to relax more rapidly than the Comparative Examples and thus relieving stresses in the film before the film crystallizes.

Melt strength values for Example 1 and 2 as well as Comparative Examples 1-4 are shown in Table 18. The tests are conducted using the Melt Strength method described infra in the Testing Methods section. The melt strength of Example 1 and 2 are lower than that of their respective Comparative Example 1 and 2, again due to their narrower molecular weight distribution as compared to the comparative sample.

TABLE 18

Melt strength as determined by the Melt Strength method for Examples 1 and 2 and Comparative Examples 1-4.

| Sample | $I_2$ (190° C.) | Density (g/cm$^3$) | Melt Strength (cN) |
|---|---|---|---|
| Example 1 | 1.1 | 0.925 | 9.4 |
| Example 2 | 1.1 | 0.924 | 10.2 |
| Comparative Example 1 | 1.1 | 0.925 | 9.9 |
| Comparative Example 2 | 1.1 | 0.925 | 11.0 |
| Comparative Example 3 | 1.0 | 0.925 | 10.8 |
| Comparative Example 4 | 0.82 | 0.923 | 16.5 |

All patents, test procedures, and other documents cited, including priority documents, are fully incorporated by reference to the extent such disclosure is not inconsistent with this invention and for all jurisdictions in which such incorporation is permitted.

What is claimed is:

1. An ethylene-based polymer with a density from about 0.90 to about 0.94 in grams per cubic centimeter, a molecular weight distribution ($M_w/M_n$) from about 2 to about 30, a melt index ($I_2$) from about 0.1 to about 50 grams per 10 minutes, and further comprising from about 5 to about 4000 parts per million by weight of sulfur as determined using a Total Sulfur Concentration method and based upon the total weight of the ethylene-based polymer, and wherein the ethylene-based polymer is formed from a reaction mixture comprising a "sulfur containing compound" containing a -S- functional group, in addition to carbon atoms substituted with hydrogen atoms, and where a portion of the hydrogen atoms may optionally be substituted by inert substituents or moieties.

2. An ethylene-based polymer of claim 1, wherein the polymer has a gpcBR value greater than 0.05 as determined by a gpcBR Branching Index by 3D-GPC.

3. The ethylene-based polymer of claim 1, wherein the polymer has a GPC-LS Characterization value (Y) from about 2.1 to about 10.

4. A composition comprising the ethylene-based polymer of claim 1.

5. The composition of claim 4, further comprising a polyolefin.

6. An article comprising at least one component formed from the composition of claim 4.

7. The article of claim 6, wherein the article is selected from a film, an extrusion coating, a molded article, a wire and cable coating, a crosslinked article, or a foam.

* * * * *